United States Patent
Oohara

(10) Patent No.: US 7,286,702 B2
(45) Date of Patent: Oct. 23, 2007

(54) COLOR IMAGE PROCESSING METHOD, COLOR IMAGE PROCESSOR, COLOR DISPLAY, COMPUTER PROGRAM FOR IMPLEMENTING THE COLOR IMAGE PROCESSING METHOD

(75) Inventor: Akemi Oohara, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 719 days.

(21) Appl. No.: 10/494,056

(22) PCT Filed: Nov. 5, 2002

(86) PCT No.: PCT/JP02/11525

§ 371 (c)(1),
(2), (4) Date: Apr. 29, 2004

(87) PCT Pub. No.: WO03/041013

PCT Pub. Date: May 15, 2003

(65) Prior Publication Data

US 2004/0246267 A1    Dec. 9, 2004

(30) Foreign Application Priority Data

Nov. 5, 2001   (JP) ............................. 2001-339717

(51) Int. Cl.
*G06K 9/00* (2006.01)
(52) U.S. Cl. ...................... 382/167; 382/162; 382/163; 382/166
(58) Field of Classification Search ................ 382/162, 382/167, 166, 103, 165, 163; 348/223.1, 348/649, 413.1, 669; 358/1.9, 520, 518, 358/530; 375/240.16
See application file for complete search history.

(56) References Cited

U.S. PATENT DOCUMENTS

| 4,812,902 | A | | 3/1989 | Fuchsberger ................ 358/521 |
|---|---|---|---|---|
| 5,966,222 | A | * | 10/1999 | Hirata et al. ................ 358/520 |
| 6,088,469 | A | * | 7/2000 | Fukumura et al. .......... 382/103 |
| 6,125,145 | A | * | 9/2000 | Koyanagi et al. ...... 375/240.16 |
| 6,453,055 | B1 | * | 9/2002 | Fukumura et al. .......... 382/103 |
| 7,092,122 | B2 | * | 8/2006 | Iwaki .......................... 358/1.9 |
| 7,215,366 | B2 | * | 5/2007 | Mori et al. .............. 348/223.1 |

FOREIGN PATENT DOCUMENTS

EP    0 684 729 A2    11/1995

(Continued)

*Primary Examiner*—Anh Hong Do
(74) *Attorney, Agent, or Firm*—Birch, Stewart, Kolasch & Birch, LLP

(57) ABSTRACT

A saturation detecting means (200) detects saturation at every pixel in a digital color image or at every coordinate point in an analog color image. A saturation conversion control means (300) determines the saturation conversion condition for the pixel or coordinate point based on the detected saturation. A saturation conversion processing means (400) implements saturation conversion in such a manner that saturation is reduced for the areas with low saturations in the color image, so as to enlarge the difference in saturation relative to the areas with high saturations, thus achieving improved saturation contrast. Further, the distribution of saturations in the input image is automatically extracted, so as to determine the threshold for deciding a saturation suppressed area based on the distribution of saturations. In this way, in order to obtain a color image improved in vividness and presenting feeling of sharpness, the saturation contrast is automatically improved.

24 Claims, 19 Drawing Sheets

| FOREIGN PATENT DOCUMENTS | | |
| --- | --- | --- |
| EP | 0 989 739 A2 | 3/2000 |
| JP | 63-67687 A | 3/1988 |
| JP | 63-173182 A | 7/1988 |
| JP | 63-267328 A | 11/1988 |
| JP | 4-248681 A | 9/1992 |
| JP | 5-205039 A | 8/1993 |
| JP | 405205039 A * | 8/1993 |
| JP | 6-124329 A | 5/1994 |
| JP | 07-253577 A | 10/1995 |
| JP | 08-329217 A | 12/1996 |
| JP | 10-23279 A | 1/1998 |
| JP | 10-200777 A | 7/1998 |
| JP | 2001-230941 A | 8/2001 |

* cited by examiner

| Plane containing point A' | f |
|---|---|
| R=0 | 0 |
| G=0 | 1 |
| B=0 | 2 |
| R=255 | 3 |
| G=255 | 4 |
| B=255 | 5 |

COLOR IMAGE PROCESSING METHOD, COLOR IMAGE PROCESSOR, COLOR DISPLAY, COMPUTER PROGRAM FOR IMPLEMENTING THE COLOR IMAGE PROCESSING METHOD

This application is the national phase under 35 U.S.C. § 371 of PCT International Application No. PCT/JP02/11525 which has an International filing date of Nov. 5, 2002, which designated the United States of America.

This nonprovisional application claims priority under 35 U.S.C. § 119(a) on Patent Application No. 2001-339717 filed in JAPAN on Nov. 5, 2001, which is herein incorporated by reference.

DESCRIPTION

1. Technical Field

The present invention relates to a color image processing method, a color image processor and a color display, for increasing the feeling of depth and the feeling of sharpness, etc., of a color image, as well as relating to a computer program for implementing the color image processing method.

2. Background Art

Conventionally, in image output devices such as displays, printers and others there are cases where saturation is enhanced in order to make the image more vivid than appearance to the eye. Such saturation emphasis techniques are often used in order to make the output closer to the saturation of the original image when images such as TV images, images captured by scanner etc., which tend to become lower in saturation than their original images are to be handled.

As an example of saturation emphasis technique, an appropriate coefficient $\alpha$ ($\alpha > 1$) is determined so as to multiply the original saturation by $\alpha$.

According to this technique, both the areas with low saturations and the areas with high saturations are uniformly multiplied by $\alpha$, so as to provide a bright image with the saturation of the whole image improved. When in this technique the coefficient $\alpha$ is set to be lower than 1, it is possible to provide a saturation reducing function of lowering the saturation of the image as a whole.

As an example, Japanese Patent Application Laid-open Hei No. 5-205039 proposes a color image processing method in which pixels with saturations equal to or greater than a certain threshold a are enhanced in saturation while pixels with saturations equal to or lower than a are not converted.

As another example, Japanese Patent Application Laid-open Hei No.8-329217 proposes a saturation converting method in which a RGB or CMY image is converted into image data in a uniform color space so as to determine a proper coefficient $\alpha$ ($\alpha > 1$) depending on the spread of saturations, whereby saturation is multiplied by a in the uniform color space.

On the other hand, for transmission type displays using liquid crystal or the like, which are less efficient in color reproducibility compared to CRTs, methods of improving color reproducibility have been proposed. For example, Japanese Patent Application Laid-open Hei 7 No. 253577 proposes a color display which can realize higher color saturation and color reproducibility compared to conventional liquid crystal displays by using color filters that can make the peak wavelengths within the transmission wavelength ranges of individual color elements approximately coincide with respective peak wavelengths of the LED backlight light source.

However, in the aforementioned method disclosed in Japanese Patent Application Laid-open Hei 5 No. 205039, areas with higher saturations are further enhanced, so that an image containing a high proportion of high saturation areas is reproduced as a whole with colors close to garish colors, resulting in an unnatural image.

In the method disclosed in Japanese Patent Application Laid-open Hei 8 No. 329217, since areas with low saturations and areas with high saturations are uniformly multiplied, the distribution of saturations is shifted as a whole to the higher saturation areas, hence this method cannot use the saturation dynamic range in an efficient manner. For example, if the saturation distribution of an original image that is represented by the thick solid line in FIG. 1 is subjected to saturation emphasis by multiplying saturation by a coefficient $\alpha$ ($\alpha > 1$), the distribution of the enhanced image is shifted to that indicated by the broken line.

Further, the distribution of saturations after the saturation emphasis concentrates on a particular range in the dynamic range, so that there is room for improvement of saturation contrast.

On the other hand, in the above-mentioned color display which is excellent in color reproducibility disclosed in Japanese Patent Application Laid-open Hei 7 No. 253577, the color reproducible range can be broadened, so that the saturation of the whole display image becomes higher, hence the problem of failing to obtain appropriate images takes place. The cause of this will be described with reference to FIGS. 19 and 20.

In FIG. 19, the solid line represents an example of the color reproduction range of a color display that is excellent in color reproducibility and the broken line represents an example of the color reproduction range of an ordinary transmission type color display. The thick solid line in FIG. 19 is the spectral locus. As the color reproduction range broadens, it becomes possible to display colors which are greater in distance from the white point W in the xy chromaticity diagram in FIG. 19, i.e., more vivid colors of higher saturation.

However, when color reproducibility is improved by refinement of the spectrum of the light source and color filters as proposed in Japanese Patent Application Laid-open Hei 7 No. 253577, the number of gray scale levels and the gray scale distance cannot be changed. As a result, a color having the same gray scale level as that in an ordinary transmission type color display is represented to be higher in saturation.

FIG. 20 represents a relationship between gray scale and saturation. In FIG. 20, the broken line represents one example of the change of saturation when one of the RGB colors is changed from 0 to 255, the maximum gray scale level, being normalized with the maximum saturation set equal to 1, in a case of an ordinary 24 bit RGB transmission type color display. The solid line represents the change of saturation with respect to the gray scale level when the saturation maximum is increased by 1.2 times by a color reproducibility enhancing means. With the same number of gray scale levels and the same gray scale distance, the amount of saturation depicted by the solid line exceeds that of the broken line, across the full range of the gray scale levels.

As a result, if an image which looks good on an ordinary transmission type color display is reproduced by a color display that is excellent in color reproducibility, the problem that the flesh color, for example, is increased in saturation and reproduced as an orange-like color takes place.

The present invention has been proposed in view of the above circumstances, the first object is to provide a color image processing method, a color image processor and a computer program for realizing the color image processing method, which can improve saturation contrast and reduce the user's burden on the adjustment of saturation contrast.

Further, the second object is to obtain good displayed images in a conventional transmission type color display excellent in color reproducibility.

SUMMARY OF THE INVENTION

In order to achieve the above objects, the color image processing method, the color image processor and the computer program for realizing the color image processing method according to the present invention are characterized as follows.

Specifically, the present invention is a color image processing method for detecting saturation at every pixel in a digital color image or at every coordinate point in an analog color image and controlling saturation conversion of the pixel or coordinate point based on the detected saturation, wherein saturation is reduced for a pixel or coordinate point at which the detected saturation is smaller than a predetermined threshold.

In the above color image processing method, saturation may be enhanced for a pixel or coordinate point at which the detected saturation is greater than a predetermined threshold.

In the above color image processing method, the predetermined threshold can be designated by a user.

In the above color image processing method, the predetermined threshold may be determined based on a distribution of saturations in a predetermined area of the image to be converted.

In the above color image processing method, when determining the predetermined threshold, the user can designate, at least, the number or ratio of the pixels or coordinate points having saturation equal to or smaller than the threshold, based on the detected distribution of saturations.

The present invention is a color image processor comprises: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; and a saturation conversion processing means for implementing saturation conversion based on the saturation conversion condition determined by the saturation conversion control means, wherein the saturation conversion control means reduces saturation for a pixel or coordinate point at which the detected saturation by the saturation detecting means is smaller than a predetermined threshold.

In the above color image processor, the saturation conversion control means may enhance saturation at a pixel or coordinate point at which the detected saturation by the saturation detecting means is greater than a predetermined threshold.

The present invention is a color image processor comprises: a saturation detecting means for detecting saturation at every pixel in a digital color image or at every coordinate point in an analog color image; a saturation conversion control means for determining the saturation conversion condition for the pixel or coordinate point based on the saturation detected by the saturation detecting means; a saturation conversion processing means for implementing saturation conversion based on the saturation conversion condition determined by the saturation conversion detecting means; and a threshold designating means for designating the threshold based on the user's operation, wherein the saturation conversion control means reduces saturation at a pixel or coordinate point at which the detected saturation by the saturation detecting means is smaller than the threshold designated by the threshold designating means.

In the above color image processor, the saturation conversion control means may enhance saturation at a pixel or coordinate point at which the detected saturation is greater than the threshold designated by the threshold designating means.

The present invention is a color image processor comprises: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; a saturation conversion processing means for implementing saturation conversion based on the saturation conversion condition determined by the saturation conversion control means; a buffer for accumulating the saturations detected by the saturation detecting means and input image data; and a threshold determining means for determining a threshold based on a distribution of saturations detected by the saturation detecting means.

The present invention is a color image processor comprises: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; a saturation conversion processing means for implementing saturation conversion based on the saturation conversion condition determined by the saturation conversion control means; a buffer for accumulating the saturation detected by the saturation detecting means and input image data; a threshold determining means for determining a threshold based on a distribution of saturations detected by the saturation detecting means; and a pixel/coordinate point count designating means which allows a user to designate a number of pixels or coordinate points to be not greater than the threshold determined by the threshold determining means, and passes the number to the threshold determining means.

The present invention is a color image processor comprises: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; a saturation conversion processing means for implementing saturation conversion based on the saturation conversion conditions determined by the saturation conversion control means; a buffer for accumulating the saturation detected by the saturation detecting means and input image data; a threshold determining means for determining a threshold based on a distribution of saturations detected by the saturation detecting means; and a pixel/coordinate point ratio designating means which allows a user to designate a ratio of pixels or coordinate points to be not greater than the threshold determined by the threshold determining means, and passes the ratio to the threshold determining means.

The present invention is a computer program for realizing a function of detecting saturation at every pixel in a digital color image or at every coordinate point in an analog color image and controlling saturation conversion of the pixel or coordinate point based on the detected saturation, wherein a function of reducing saturation at a pixel or coordinate point at which the detected saturation is smaller than a predetermined threshold is added.

In the above computer program, a function of enhancing saturation at a pixel or coordinate point at which the detected saturation is greater than a predetermined threshold may be added.

In the above computer program, a function of allowing a user to designate the predetermined threshold may be added.

In the above computer program, a function of determining the predetermined threshold based on a distribution of saturations in a predetermined area of the image to be converted may be added.

In the above computer program, a function of allowing a user, when determining the predetermined threshold, to designate at least one of a number and ratio of the pixels or coordinate points having saturation equal to or smaller than the threshold, based on the detected distribution of saturations may be added.

A color display according to the present invention includes a color image processor comprising: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; and a saturation conversion processing means for implementing saturation conversion based on the saturation conversion condition determined by the saturation conversion control means, wherein the saturation conversion control means reduces saturation for a pixel or coordinate point at which the detected saturation by the saturation detecting means is smaller than a predetermined threshold.

In the above color display, the saturation conversion control means may enhance saturation at a pixel or coordinate point at which the detected saturation by the saturation detecting means is greater than a predetermined threshold.

A color display according to the present invention includes a color image processor comprising: a saturation detecting means for detecting saturation at every pixel in a digital color image or at every coordinate point in an analog color image; a saturation conversion control means for determining the saturation conversion condition for the pixel or coordinate point based on the saturation detected by the saturation detecting means; a saturation conversion processing means for implementing saturation conversion based on the saturation conversion condition determined by the saturation conversion detecting means; and a threshold designating means for designating a threshold based on the user's operation, wherein the saturation conversion control means reduces saturation at a pixel or coordinate point at which the detected saturation by the saturation detecting means is smaller than the threshold designated by the threshold designating means.

In the above color display, the saturation conversion control means may enhance saturation at a pixel or coordinate point at which the detected saturation is greater than the threshold designated by the threshold designating means.

A color display according to the present invention includes a color image processor comprising: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; a saturation conversion processing means for implementing saturation conversion based on the saturation conversion condition determined by the saturation conversion control means; a buffer for accumulating the saturation detected by the saturation detecting means and input image data; and a threshold determining means for determining a threshold based on a distribution of saturations detected by the saturation detecting means.

A color display according to the present invention includes a color image processor comprising: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; a saturation conversion processing means for implementing saturation conversion based on the saturation conversion condition determined by the saturation conversion control means; a buffer for accumulating the saturation detected by the saturation detecting means and input image data; a threshold determining means for determining a threshold based on a distribution of saturations detected by the saturation detecting means; and a pixel/coordinate point count designating means which allows a user to designate a number of pixels or coordinate points to be not greater than the threshold determined by the threshold determining means, and passes the number to the threshold determining means.

A color display according to the present invention includes a color image processor comprising: a saturation detecting means for detecting saturation at every pixel in a digital color image or at every coordinate point in an analog color image; a saturation conversion control means for determining a saturation conversion condition for the pixel or coordinate point based on the saturation detected by the saturation detecting means; a saturation conversion processing means for implementing saturation conversion based on the saturation conversion condition determined by the saturation conversion control means; a buffer for accumulating the saturation detected by the saturation detecting means and input image data; a threshold determining means for determining a threshold based on a distribution of saturations detected by the saturation detecting means; and a pixel/coordinate point ratio designating means which allows a user to designate a ratio of pixels or coordinate points to be not greater than the threshold determined by the threshold determining means, and passes the ratio to the threshold determining means.

Thus, the color image processing method, the color image processor and the computer program for realizing the color image processing method according to the present invention have the above configurations, and have the effects as follows.

Specifically, according to the color image processing method and the color image processor of the present invention, saturation is detected at every pixel so as to effect saturation suppression for the areas with low saturations, whereby it is possible to produce a good color image with enhanced feeling of depth and feeling of sharpness.

Next, according to the color image processing method and the color image processor of the present invention, saturation is detected at every pixel so as to effect saturation suppression for the areas with low saturations and saturation enhancement for the areas with high saturations, whereby it is possible to produce a color image which presents a feeling of depth and a feeling of sharpness and a sufficient saturation contrast.

Further, according to the color image processing method and the color image processor of the present invention, provision of the threshold designating means enables the user to designate the desired threshold. Therefore, the user is able to modify the parameter for the conversion equation in an appropriate manner while watching the image displayed on a display such as a display monitor, whereby it is possible to produce a color image presenting a feeling of depth and a feeling of sharpness that are suited to the user's taste. It is also possible to provide a color image presenting a saturation contrast that is suited to the user's taste.

According to the color image processing method and the color image processor of the present invention, a buffer for accumulating the RGB signal for a predetermined area and saturation information and a threshold determining means for determining the suitable threshold based on the saturation inside the predetermined area are provided. Thereby, the distribution of saturations in the input image is automatically extracted so that the threshold for deciding the saturation suppressed area is determined based on the distribution of saturations, whereby it is possible to automatically produce a good color image presenting an enhanced feeling of depth and feeling of sharpness with a sufficient saturation contrast.

According to the color image processing method and the color image processor of the present invention, provision of a pixel/coordinate point designating means or pixel/coordinate point ratio designating means enables the user to designate the desired ratio of pixels/coordinate points to be converted, and the like. Therefore, it is possible to automatically produce a color image which presents beneficial saturation contrast and is suited to the user's taste with an enhanced feeling of depth and sharpness.

Moreover, according to the computer program of the present invention, the above-described effects can be obtained by realizing the above color image processors and color image processing methods.

Moreover, according to the color display of the present invention, provision of the above-described color image processor for a transmission type color display which is more excellent in color reproducibility than conventional transmission type color displays, can produce the effects stated above and provide a natural, favorable, color image with saturation enhancement of medium colors such as flesh color suppressed.

DETAILED DESCRIPTION OF THE INVENTION

Figure 1:
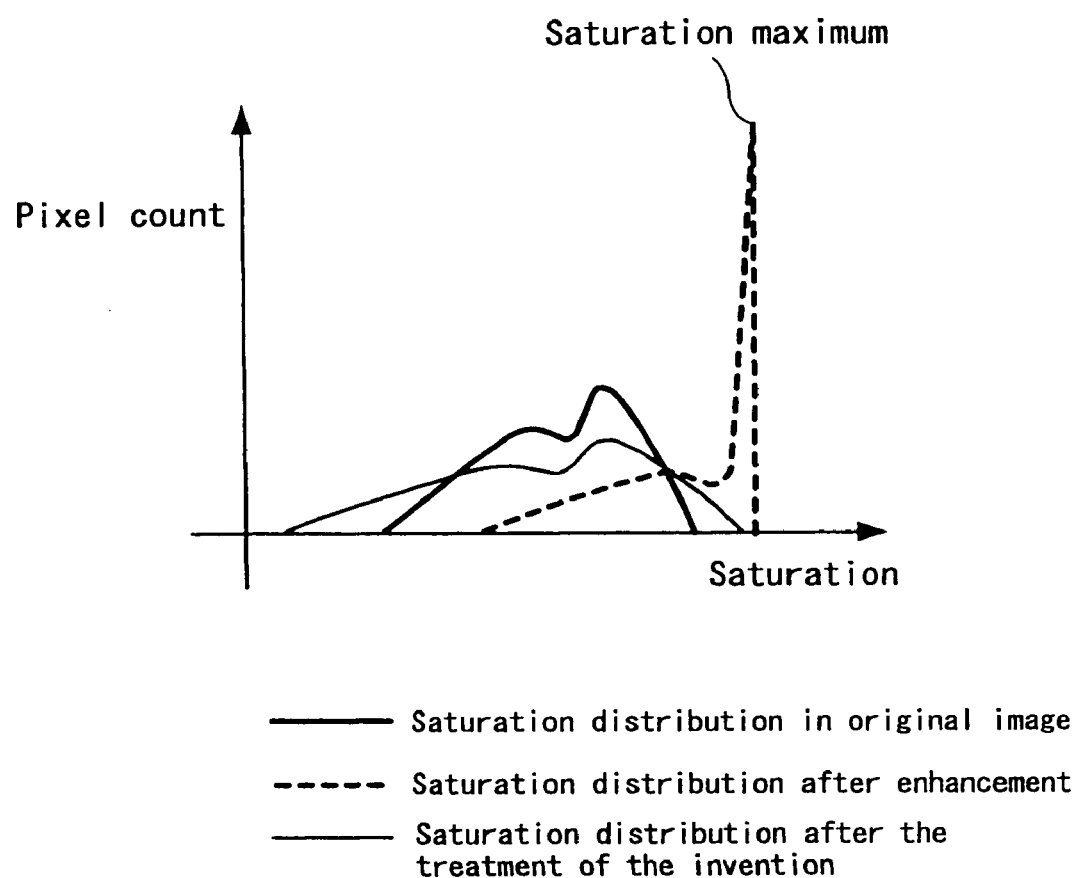
FIG. 1 is an illustrative view showing a distribution of saturations.

Referring now to the drawings, the embodiments of the color image processing method, color image processor and computer program for realizing the color image processing method according to the present invention will be described.

The first embodiment

To begin with, a color image processor and a color image processing method according to the first embodiment of the present invention will be described.

Figure 6:
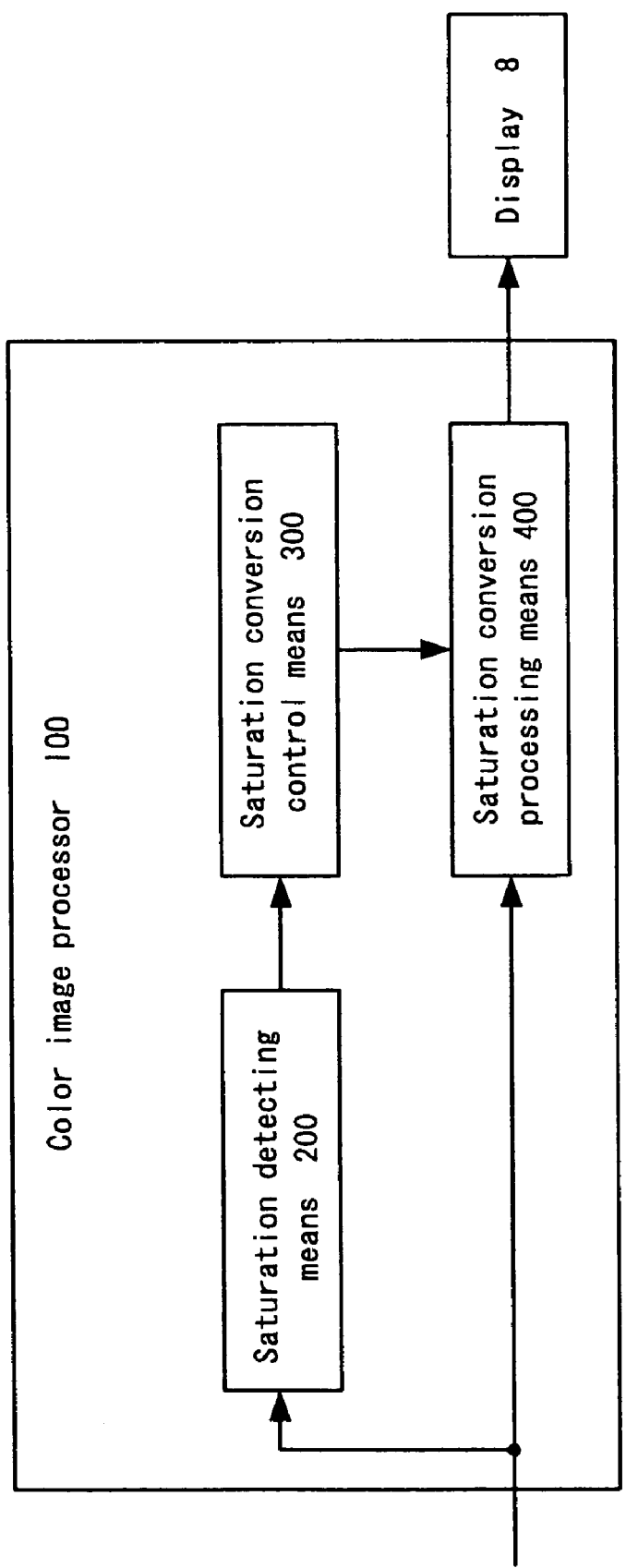
FIG. 6 is a block diagram showing an overall configuration of a color image processor according to the first embodiment of the present invention.

FIG. 6 is a block diagram showing an overall configuration of a color image processor according to the first embodiment of the present invention.

The color image processor 100 according to the first embodiment includes: as shown in FIG. 6, a saturation detecting means 200, a saturation conversion control means 300 and a saturation conversion processing means 400.

Saturation detecting means 200 detects the saturation C that is normalized by the following process, for example, from the RGB signal of an original color image, and outputs it.

Figure 3:
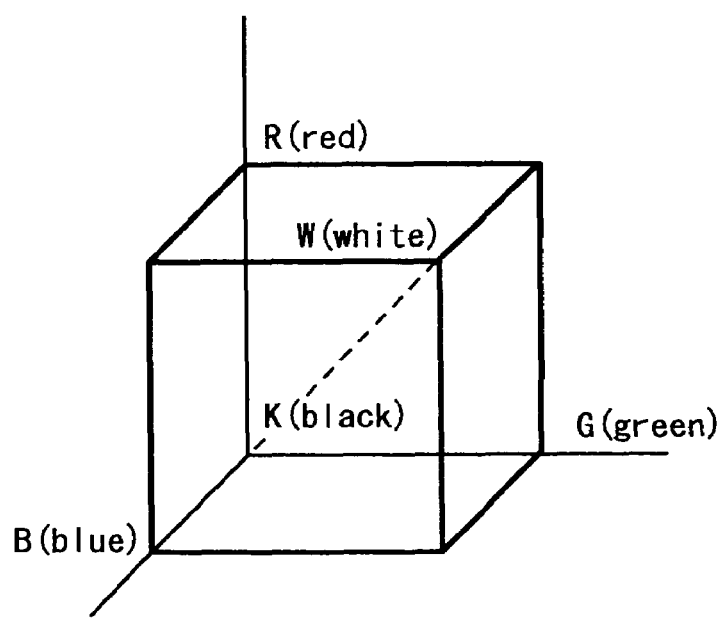
FIG. 3 is an illustrative view showing a displayable color range in the RGB space.

Specifically, for the RGB signal of an original color image, the saturation C in the 3-dimensional space defined along the axes of the three signals is considered. As shown in FIG. 3, in the displayable color range in the RGB space, achromatic colors, white, black and gray, all resides in the straight line K-W, and becomes gradually brighter from point K to point W, or from black to white.

Figure 4:
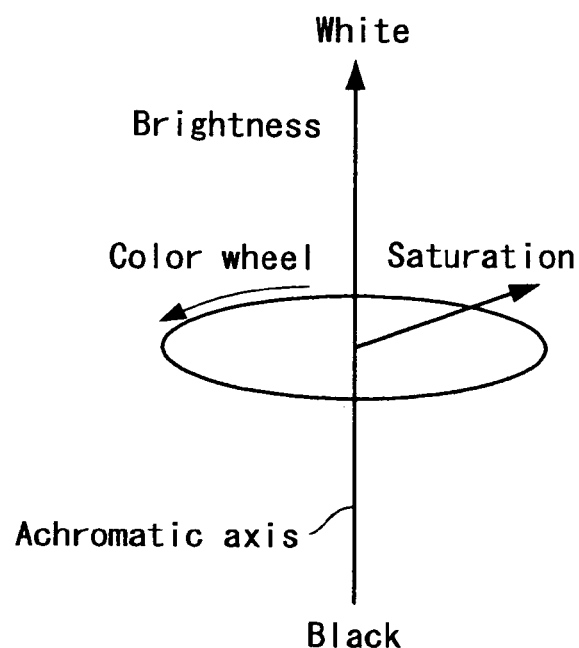
FIG. 4 is an illustrative view showing the arrangement rule of object colors in a 3-dimensional space.

As shown in FIG. 4, in the 3-D space of object color, the saturation is represented as the distance from the achromatic axis extending from black to white, in the direction perpendicular thereto. This concept of saturation shall be applied to the displayable color range in RGB space.

Figure 14:
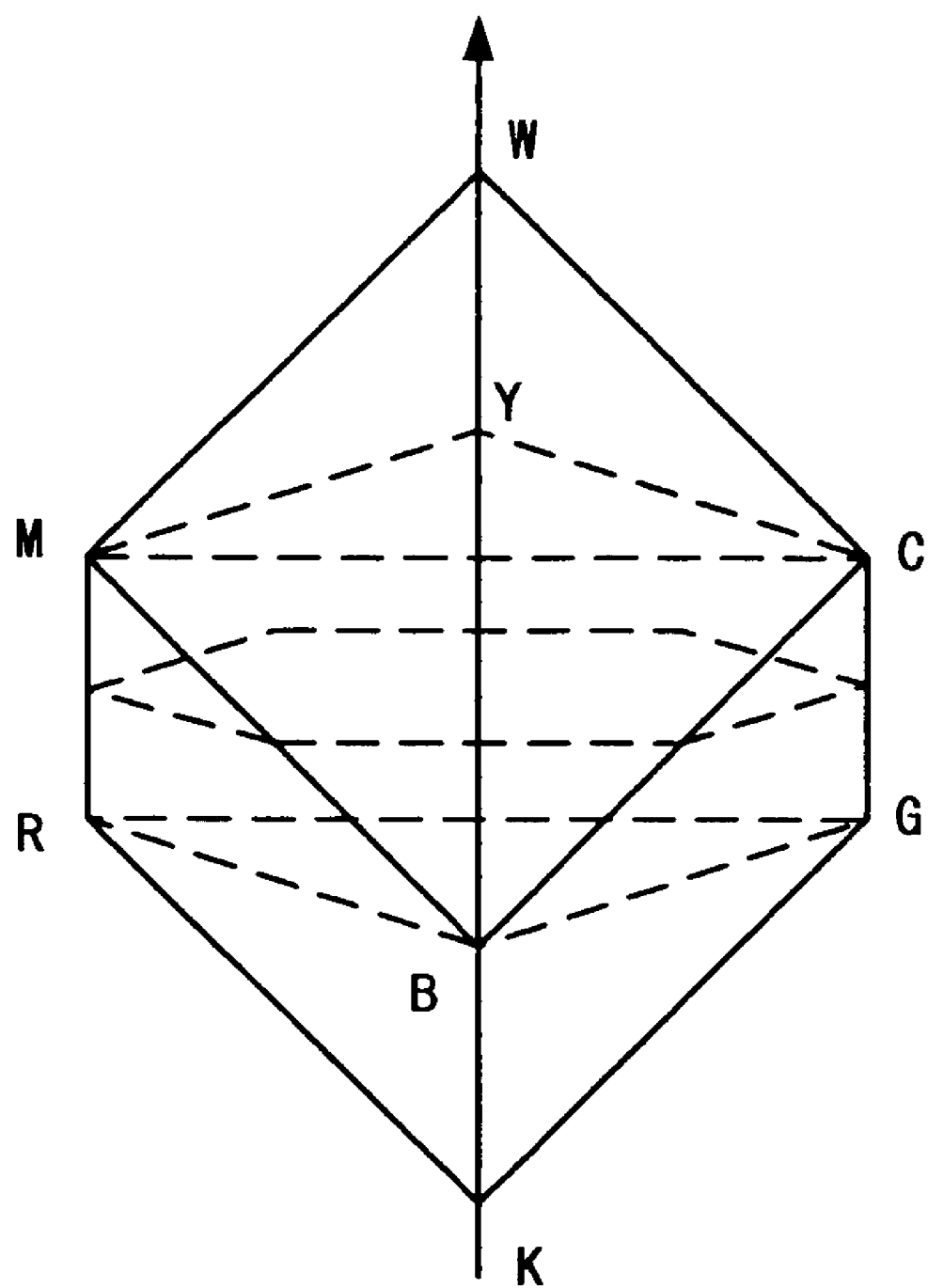
FIG. 14 is an illustrative view showing the straight line K-W of achromatic colors in the displayable color range in the RGB space is adapted to coincide with the achromatic axis of object colors in the 3-dimetnional space.

FIG. 14 is a drawing in which the achromatic color line K-W in the displayable color range in the RGB space is made coincident with the achromatic axis of the 3-D space of object color. The colors that are actually displayable exist only inside the cube shown in FIG. 14. Based on FIG. 14, the saturation is defined as the distance from the line K-W and is normalized by the contour of the color solid.

Figure 2:
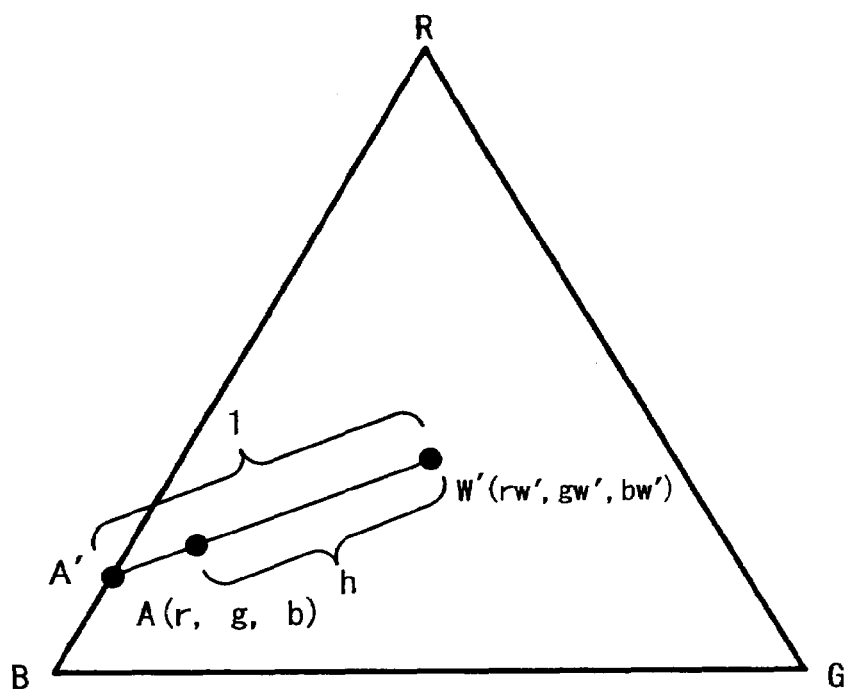
FIG. 2 is an illustrative view showing a process of detecting saturation.

FIG. 2 is an illustration for explaining the method of normalization, and is a section when FIG. 3 is cut along the plane including R, G and B.

Figure 5:
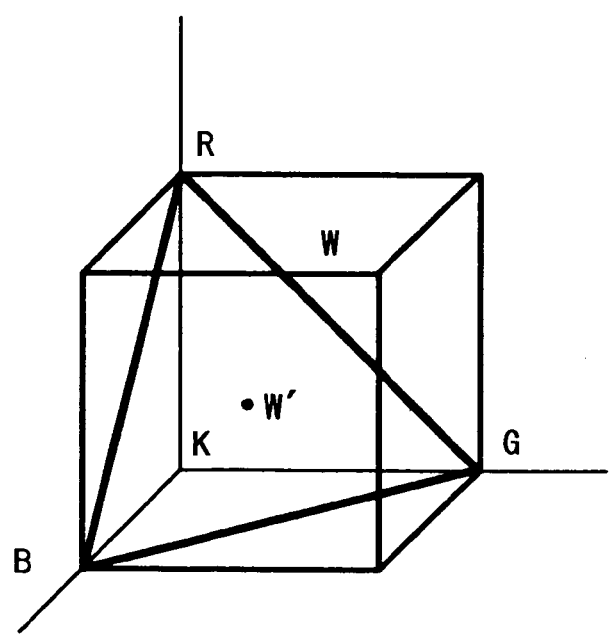
FIG. 5 is an illustrative view showing cut points in R, G and B.

In FIG. 5, when the displayable color range in the RGB space is cut along the lines of the cutting plane, depicted by the thick line, the cutting plane of FIG. 2 can be obtained. Now, description will be made of a case where the normalized saturation C as to a point A (r,g,b) on the plane of FIG. 2 is determined.

A line joining between the point W' on the achromatic axis within the plane of FIG. 2 and point A is extended in the direction from point W' to point A, and the point at which the line intersects the contour of the RGB color solid is called point A'. The distance between point A' and point W' is called l and the distance between point W' and point A is called h, and the normalized saturation C is defined by the following expression:

$$C = h/l \quad (1)$$

If the coordinates of point W' are represented by (rw', gw', bw'), rw'=gw'=bw' and rw'+gw'+bw'=r+g+b. From this, the following equation (2) holds $$rw' = gw' = bw' = (r+g+b)/3 \quad (2)$$

From the above, for an arbitrary RGB signal, the coordinates of the intersection W' between the perpendicular to the achromatic axis line K-W on the variable display area and the line K-W can be obtained. The distance h between an arbitrary point A and point W' can be calculated based on the parameters (r,g,b) of point A, by the following equation (3):

$$h = [\{(2r-g-b)/3\}^2 + \{(2g-r-b)/3\}^2 + \{(2b-r-g)/3\}^2]^{1/2} \quad (3)$$

Figure 13:
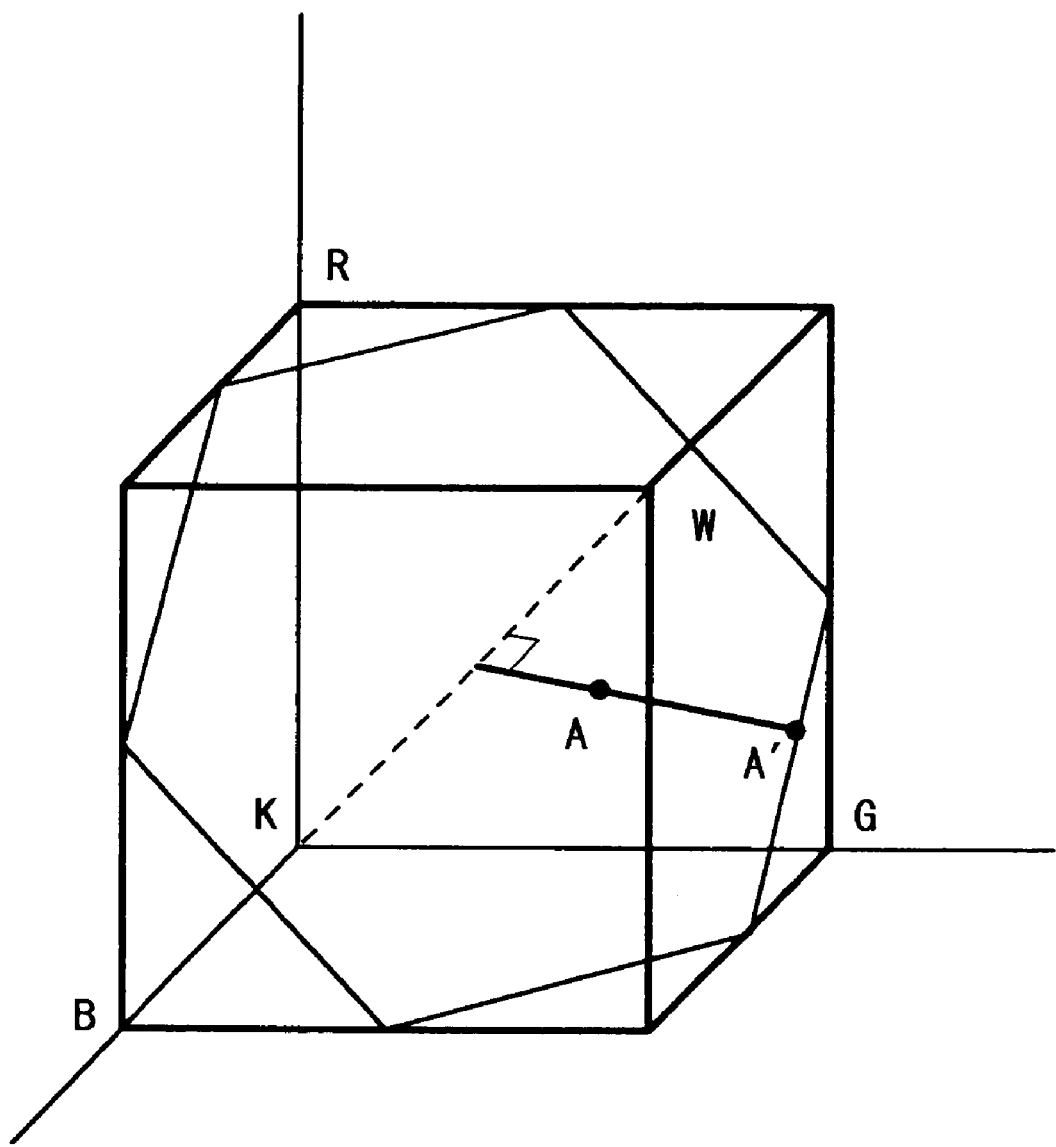
FIG. 13 is an illustrative view showing a hexagonal section of the displayable color range in the RGB space.

Incidentally, an arbitrary point A can exist at any position inside the displayable color range in the RGB space. Though the above method was described taking an example in which an arbitrary point A exists on the cutting plane, cut by the lines joining R, G and B, there are cases where an arbitrary point A exists on a hexagonal cutting plane as shown in FIG. 13. FIG. 14 shows a hexagon similar to FIG. 13 with dotted line.

The contour of the plane shown in FIG. 2 is contained within planes R=0, G=0 or B=0. On the other hand, the contour of the hexagon shown in FIG. 13 is contained within any of six planes, i.e., those above and added three planes, R=1, G=1 and B=1. These, R=1, G=1 and B=1, represent normalized signal values. For example, for a case of 24 bit RGB signal, these six planes correspond to R=0, G=0, B=0, R=255, G=255 and B=255. The intersections of the straight line passing point A and point W' with these six planes are determined. The closest point on the extension of the line W'-A is called A', and the distance between point A' and point W' can be obtained as 1. In this way, the saturation C can be determined from the RGB signal.

Figures 11, 12:
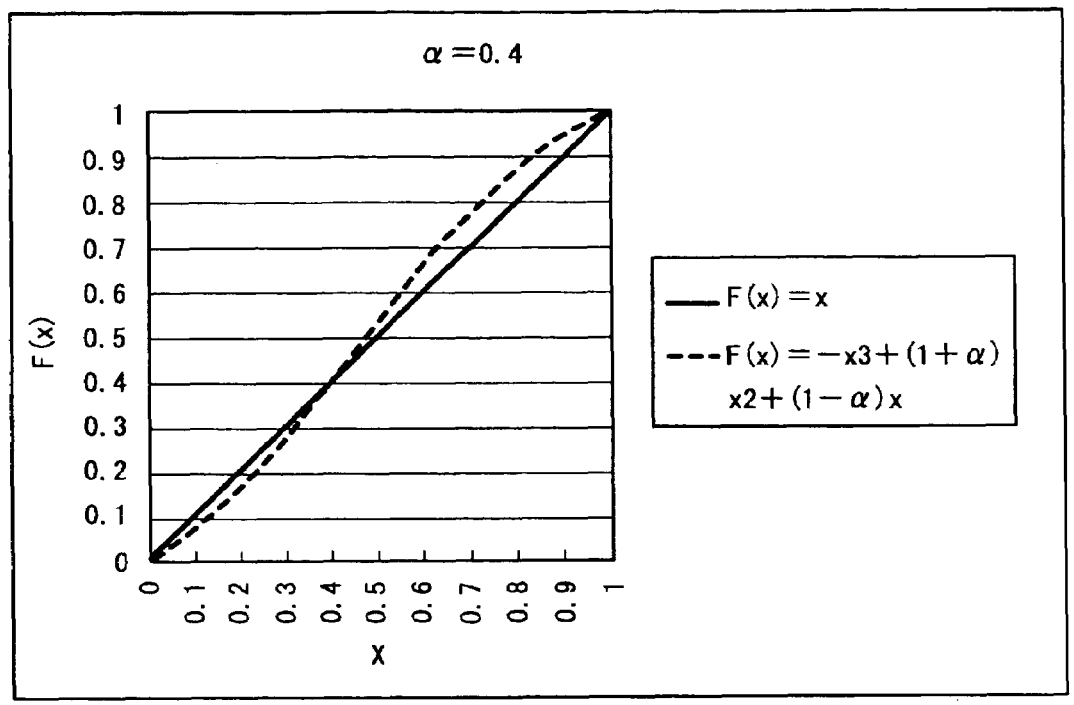
FIG. 11 is an illustrative view showing a saturation conversion curve in a color image processor according to the second embodiment of the present invention.
FIG. 12 is an illustration of an allocation example of a variable f.

Of the six planes constituting the contour of the displayable color area in the RGB space, a variable f that represents the plane which contains point A' is passed together with the saturation C to saturation conversion control means 300. Variable f is determined as shown in FIG. 12, for example.

Saturation conversion control means 300, based on the saturation C given from saturation detecting means 200 and a predetermined threshold α, calculates the value of saturation C' after conversion and passes it to saturation conversion processing means 400. The saturation C before conversion and the saturation C' after conversion are related by the following equation (4), and the function for conversion F(x) is represented in the form of the following equation (5), for example, depending on the threshold α:

$$C' = F(C) \quad (4)$$

$$F(x) = x^2 + (1-\alpha)x \text{ when } x \leq \alpha$$

$$F(x) = x \text{ when } \alpha < x \quad (5)$$

Figure 15:
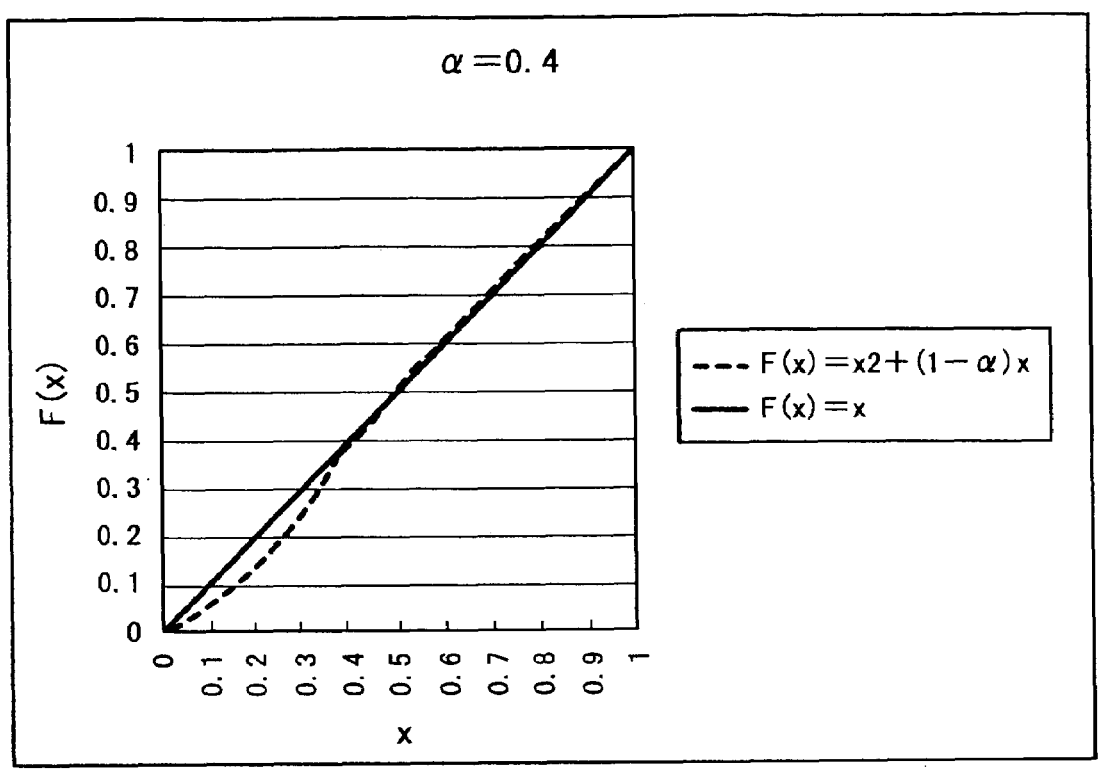
FIG. 15 is an illustrative view showing a saturation conversion curve in a color image processor according to the first embodiment of the present invention.

FIG. 15 shows a graph relating to equation (5).

Because equation (5) consists of addition and multiplication only, saturation conversion control means 300 can be simply realized by combination of adders and multipliers when it is configured by hardware. Realization of saturation conversion control means 300 by software is more simple, that is, it is achieved by merely substituting x by a given value of saturation C in equation (5). The converting equation F(x) used in saturation conversion control means 300 does not need to take the form of equation (5) as long as conversion is implemented so that C'≦C for the areas where saturation is lower than the threshold. Further, saturation conversion control means 300 does not perform any particular process over the variable f that is noticed by saturation detecting means 200 but simply outputs it to the saturation conversion processing means as it is.

Saturation conversion processing means 400 converts the RGB signal of the original color image in conformity with the saturation C after conversion, which is given by saturation conversion control means. Conversion of the RGB signal is carried out by the following method, for example.

Expressions (7) to (9) show the converting equations for a case when R+G+B≦255 and Min(R,G,B)=R. Min(R,G,B) represents the minimum value of the three signal values of R, G and B, at each pixel/coordinate point of the original color image. In the following equations, Av(R,G,B) represents the average of the same three signal values of R, G and B as the above.

$$R'=(1-C')\times Av(R,G,B) \tag{7}$$

$$G'=[1-\{G-Av(R,G,B)\}/\{R-Av(R,G,B)\}\times C']\times Av(R,G,B) \tag{8}$$

$$B'=[1-\{B-Av(R,G,B)\}/\{R-Av(R,G,B)\}\times C']\times Av(R,G,B) \tag{9}$$

Though the derivation method is abbreviated, these are equations corresponding to conversion of h/l into h'/l=C' in FIG. 2. These equations represent a case where the perpendicular line from the achromatic color line K-W to a point of data in the displayable color range in the RGB space, cuts through the contour R=O in the displayable color range. The cases of Min (R,G,B)=G and Min (R,G,B)=B are similarly represented respectively by $$R'=[1-\{R-Av(R,G,B)\}/\{G-Av(R,G,B)\}\times C']\times Av(R,G,B) \tag{10}$$

$$G'=(1-C')\times Av(R,G,B) \tag{11}$$

$$B'=[1-\{B-Av(R,G,B)\}/\{G-Av(R,G,B)\}\times C']\times Av(R,G,B) \tag{12}$$

and $$R'=[1-\{R-Av(R,G,B)\}/\{B-Av(R,G,B)\}\times C']\times Av(R,G,B) \tag{13}$$

$$G'=[1-\{G-Av(R,G,B)\}/\{B-Av(R,G,B)\}\times C']\times Av(R,G,B) \tag{14}$$

$$B'=(1-C')\times Av(R,G,B) \tag{15}$$

On the other hand, when the perpendicular line from the achromatic color line K-W cuts through the contour R=255, G=255 or B=255 in the displayable color range, the conditions are represented by Max(R,G,B)=R, Max(R,G,B)=G and Max(R,G,B)=B, respectively, and the equations of conversion are given as follows, respectively. Here, Max(R,G,B) represents the maximum value of the three signal values of R, G and B, at each pixel/coordinate point of the original color image.

When Max(R,G,B)=R, $$R'=(1-C')\times Av(R,G,B)+255\times C' \tag{16}$$

$$G'=[1-\{G-Av(R,G,B)\}/\{R-Av(R,G,B)\}\times C']\times Av(R,G,B)+255\times\{G-Av(R,G,B)/\{R-Av(R,G,B)\}\times C' \tag{17}$$

$$B'=[1-\{B-Av(R,G,B)\}/\{R-Av(R,G,B)\})\times C']\times Av(R,G,B)+255\times\{B-Av(R,G,B)\}/\{R-Av(R,G,B)\}\times C' \tag{18}$$

When Max(R,G,B)=G, $$R'=[1-\{R-Av(R,G,B)\}/\{G-Av(R,G,B)\}\times C']\times Av(R,G,B)+255\times\{R-Av(R,G,B)\}/\{G-Av(R,G,B)\}\times C' \tag{19}$$

$$G'=(1-C')\times Av(R,G,B)+255\times C' \tag{20}$$

$$B'=[1-\{B-Av(R,G,B)\}/\{G-Av(R,G,B)\}\times C']\times Av(R,G,B)+25\times\{B-Av(R,G,B)/\{G-Av(R,G,B)\}\times C' \tag{21}$$

When Max(R,G,B)=B, $$R'=[1-\{R-Av(R,G,B)\}/\{B-Av(R,G,B)\}\times C']\times Av(R,G,B)+255\times\{R-Av(R,G,B)/\{B-Av(R,G,B)\}\times C' \tag{22}$$

$$G'=[1-\{G-Av(R,G,B)\}/\{B-Av(R,G,B)\}\times C']\times Av(R,G,B)+255\times\{G-Av(R,G,B)/\{B-Av(R,G,B)\}\times C' \tag{23}$$

$$B'=(1-C')\times Av(R,G,B)+255\times C' \tag{24}$$

As described above, there are six sets of equations of conversion. Which set should be used is determined based on the variable f, which is detected when saturation detecting means 200 detects the saturation.

The above method is one example of the saturation calculating method of the pixel, saturation conversion may also be implemented based on the saturation determined by another calculation method. As other examples of saturation calculating methods, L*a*b* values defined by CIE1976 are calculated from the RGB values and the saturation defined in the L*a*b* uniform color space is calculated. Alternatively, the saturation defined in the L*u*v* uniform color space defined by CIE1976 may be calculated in the same manner. Alternatively, a ROM table may be provided so as to previously store therein saturation data for input RGB values, so that a corresponding saturation value can be read out from the ROM table every time the RGB signal of the pixel is input, whereby saturation conversion may be implemented based on this saturation value.

In the color image processor 100 according to the first embodiment, saturation detecting means 200 determines the saturation at the pixel/coordinate point first, based on the RGB signal of each pixel/coordinate point. Then, based on the determined saturation, saturation conversion control means 300 calculates the saturation C' after conversion and passes it to saturation conversion processing means 400. Saturation conversion processing means 400, based on the input RGB signal and the noticed saturation C' after conversion, appropriately converts the RGB signal and outputs the result to a display 8 such as a display monitor.

The second embodiment

Next, a color image processor and a color image processing method according to the second embodiment of the present invention will be described.

Figure 16:
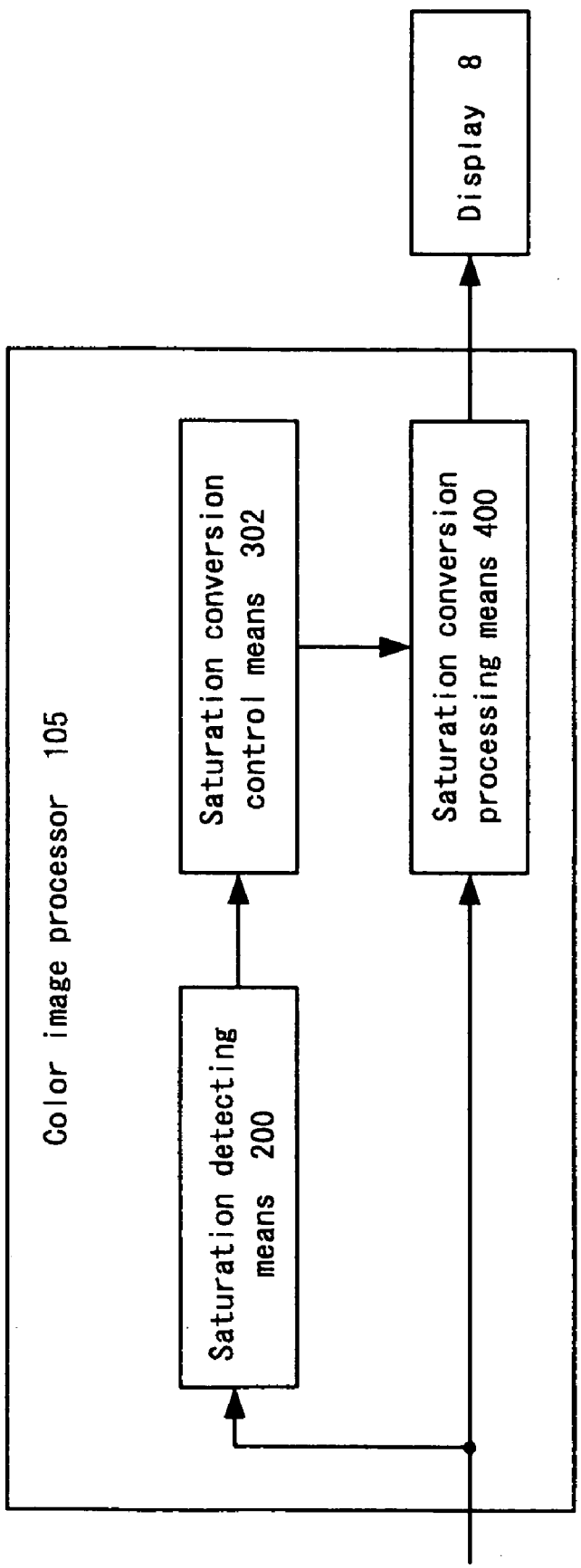
FIG. 16 is a block diagram showing an overall configuration of a color image processor according to the second embodiment of the present embodiment.

FIG. 16 is a block diagram showing an overall configuration of a color image processor according to the second embodiment of the present invention.

The color image processor 105 according to the second embodiment includes: as shown in FIG. 16, a saturation detecting means 200, a saturation conversion control means 302 and a saturation conversion processing means 400.

The saturation detecting means 200 and saturation conversion processing means 400 operate in the same manner as that of the first embodiment described with reference to FIG. 6.

Saturation conversion control means 302, based on the saturation C given from saturation detecting means 200 and a predetermined threshold α, calculates the value of saturation C' after conversion and passes it to saturation conversion processing means 400. The saturation C before conversion and the saturation C' after conversion are related by the equation (4), and the function for conversion F(x) is represented in the form of the following equation (6), for example, depending on the threshold α:

$$F(x)=-x^3+(1+\alpha)x^2+(1-\alpha)x \tag{6}$$

FIG. 11 shows a graph relating to equation (6).

Similarly to the case of equation (5), saturation conversion control means 300 can be easily realized by hardware or software.

The converting equation F(x) used in saturation conversion control means 302 does not need to take the form of equation (6) as long as conversion is implemented so that C'>C for the areas where the saturation is higher than the threshold and C'≦C for the areas where the saturation is lower than the threshold. Further, saturation conversion control means 302 does not perform any particular process over the variable f that is noticed from saturation detecting means 200 but simply outputs it to saturation conversion processing means 400 as it is.

In the color image processor 105 according to the second embodiment, saturation detecting means 200 determines the saturation at the pixel/coordinate point first, based on the RGB signal for each pixel/coordinate point. Then, based on the determined saturation, saturation conversion control means 302 calculates the saturation C' after conversion and passes it to saturation conversion processing means 400. Saturation conversion processing means 400, based on the input RGB signal and the noticed saturation C' after conversion, appropriately converts the RGB signal and outputs the result to a display 8 such as a display monitor.

The third embodiment

Next, a color image processor and a color image processing method according to the third embodiment of the present invention will be described.

Figure 7:
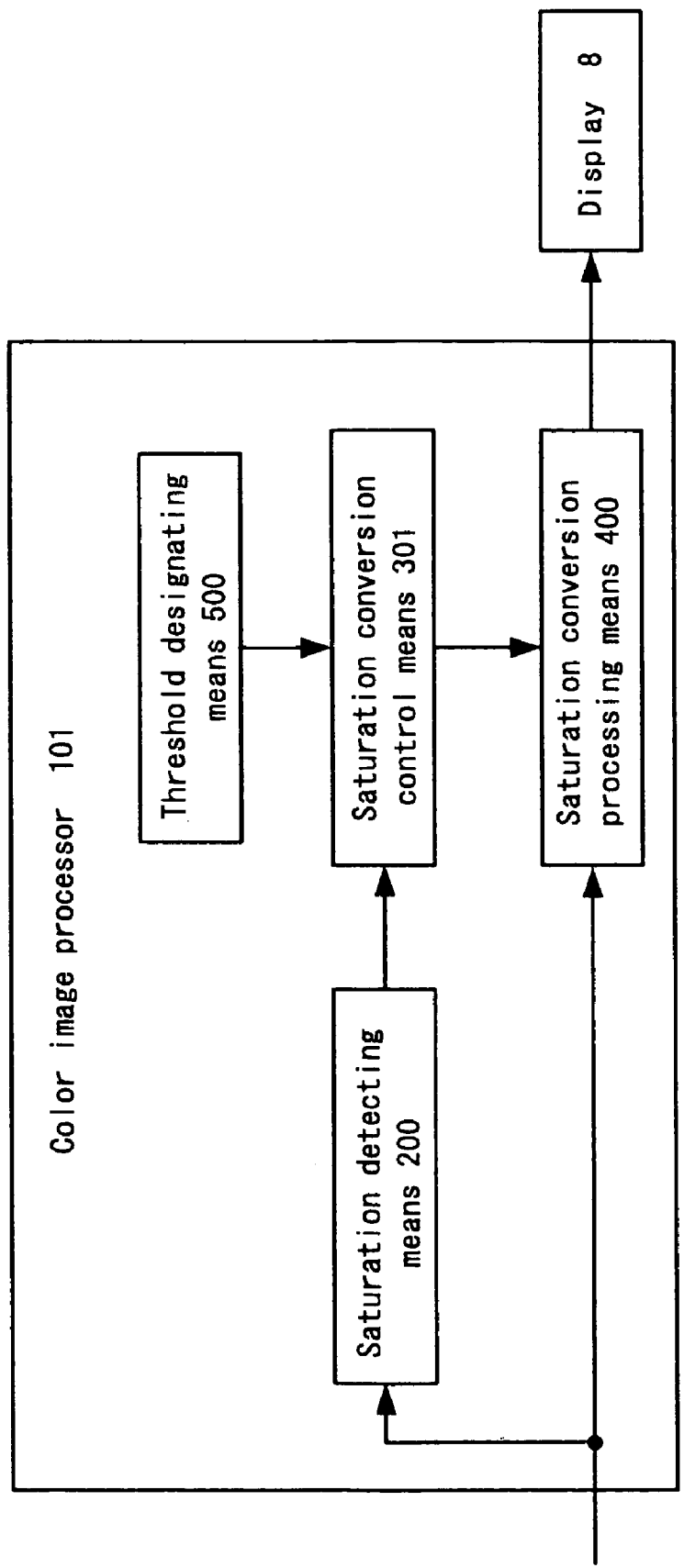
FIG. 7 is a block diagram showing an overall configuration of a color image processor according to the third embodiment of the present invention.

FIG. 7 is a block diagram showing an overall configuration of a color image processor according to the third embodiment of the present invention.

The color image processor 101 according to the third embodiment includes: as shown in FIG. 7, a saturation detecting means 200, a saturation conversion control means 301, a saturation conversion processing means 400 and a threshold designating means 500.

The saturation detecting means 200 and saturation conversion processing means 400 operate in the same manner as that of the first embodiment described with reference to FIG. 6.

Threshold designating means 500 may be constituted of, for example, a dedicated numeral input device such as numeral keys, a multi-purpose input device such as PC keyboard. When the user inputs the desired threshold, the threshold designating means 500 gives notice of the input threshold to saturation conversion control means 301.

Saturation conversion control means 301, based on the user's desired threshold α noticed from threshold designating means 500, performs saturation conversion shown by equations (4) and (5). The saturation C' after conversion is passed to saturation conversion processing means 400.

In the color image processor 105 according to the third embodiment, the user designates the desired saturation threshold through threshold designating means 500, first. Then, saturation detecting means 200 determines the saturation at the pixel/coordinate, based on the input RGB signal for each pixel/coordinate point. Next, based on the determined saturation and the threshold designated by the user, saturation conversion control means 301 calculates the saturation C' after conversion and passes it to saturation conversion processing means 400. Saturation conversion processing means 400, based on the input RGB signal and the noticed saturation C' after conversion, appropriately converts the RGB signal and outputs the result to a display 8 such as a display monitor.

The fourth embodiment

Next, a color image processor and a color image processing method according to the fourth embodiment of the present invention will be described.

Figure 17:
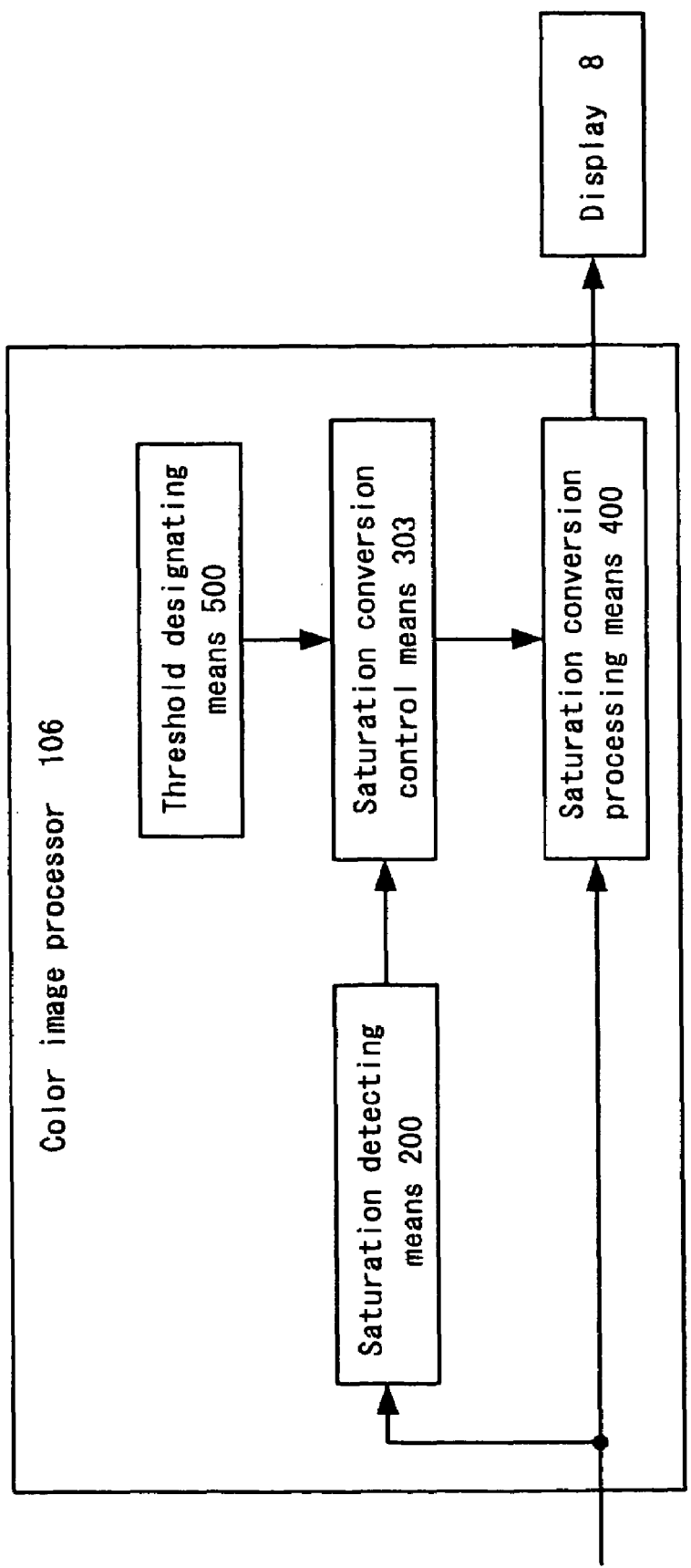
FIG. 17 is a block diagram showing an overall configuration of a color image processor according to the fourth embodiment of the present embodiment.

FIG. 17 is a block diagram showing an overall configuration of a color image processor according to the fourth embodiment of the present invention.

The color image processor 106 according to the fourth embodiment includes: as shown in FIG. 17, a saturation detecting means 200, a saturation conversion control means 303, a saturation conversion processing means 400 and a threshold designating means 500.

The saturation detecting means 200 and saturation conversion processing means 400 operate in the same manner as that of the first embodiment described with reference to FIG. 6.

Threshold designating means 500 may be constituted of, for example, a dedicated numeral input device such as numeral keys, a multi-purpose input device such as PC keyboard. When the user inputs the desired threshold, the threshold designating means 500 gives notice of the input threshold to saturation conversion control means 303.

Saturation conversion control means 303, based on the user's desired threshold α noticed from threshold designating means 500, performs saturation conversion shown by equations (4) and (6). The saturation C' after conversion is passed to saturation conversion processing means 400.

In the color image processor 106 according to the fourth embodiment, the user designates a desired threshold through threshold designating means 500, first. Then, saturation detecting means 200 determines the saturation at the pixel/coordinate, based on the input RGB signal for each pixel/coordinate point. Next, based on the determined saturation and the threshold designated by the user, saturation conversion control means 303 calculates the saturation C' after conversion and passes it to saturation conversion processing means 400. Saturation conversion processing means 400, based on the input RGB signal and the noticed saturation C' after conversion, appropriately converts the RGB signal and outputs the result to a display 8 such as a display monitor.

The fifth embodiment

Next, a color image processor and a color image processing method according to the fifth embodiment of the present invention will be described.

Figure 8:
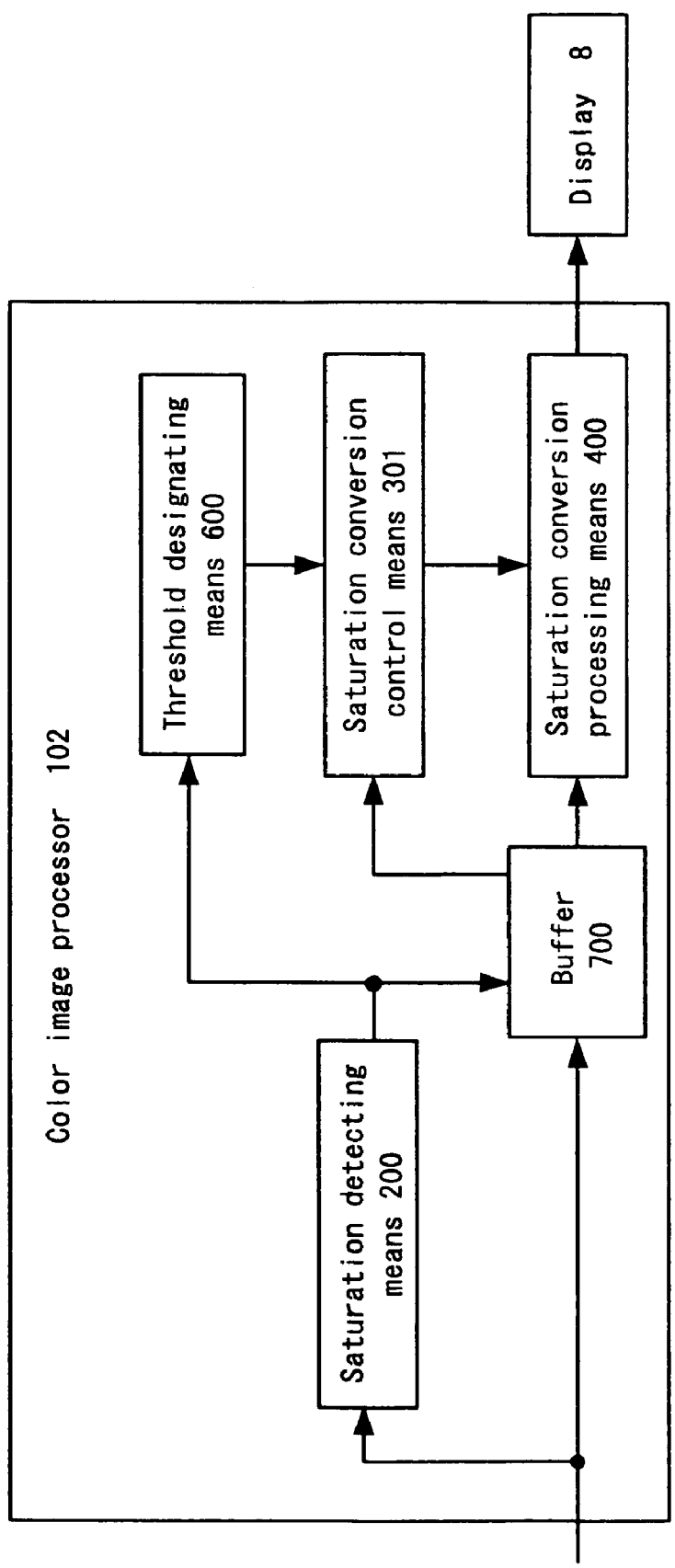
FIG. 8 is a block diagram showing an overall configuration of a color image processor according to the fifth embodiment of the present invention.

FIG. 8 is a block diagram showing an overall configuration of a color image processor according to the fifth embodiment of the present invention.

The color image processor 102 according to the fifth embodiment includes: as shown in FIG. 8, a saturation detecting means 200, a saturation conversion control means 301, a saturation conversion processing means 400, a threshold determining means 600 and a buffer 700.

The saturation detecting means 200 and saturation conversion processing means 400 operate in the same manner as that of the first embodiment described with reference to FIG. 6. The saturation conversion control means 301 operates in the same manner as that of the third embodiment described with reference to FIG. 7.

The saturation C and variable f, detected by saturation detecting means 200, are once stored into buffer 700 and at the same time passed to threshold determining means 600.

Threshold determining means 600 determines the mean value of the saturations C of the predetermined area noticed from saturation detecting means 200 and gives notice of it as the threshold α to saturation conversion control means 301.

Saturation conversion control means 301, based on the noticed threshold α and the saturation C read out from buffer 700, performs saturation conversion and gives notice of the saturation C' after conversion to saturation conversion processing means 400.

Saturation conversion processing means 400, based on the RGB signal read from buffer 700 and the noticed saturation C' after conversion, appropriately converts the RGB signal and outputs the result to a display 8 such as a display monitor.

In the color image processor 102 according to the fifth embodiment, saturation detecting means 200 detects saturation C of the RGB signal, input successively for each pixel/coordinate point from saturation detecting means 200, first, and stores it together with the RGB signal into buffer 700 and gives notice of the saturation C to threshold determining means 600. When input of the RGB signal and detection of saturation is complete for a predetermined area so that the RGB signal and saturations for the predetermined area are accumulated into buffer 700, threshold determining means 600 calculates the mean value of noticed saturations C and gives notice of it as the threshold $\alpha$ to saturation conversion control means 301.

Saturation conversion control means 301 calculates the saturation C' after conversion based on the noticed threshold $\alpha$ and passes it to saturation conversion processing means 400.

Saturation conversion processing means 400, based on the input RGB signal and the noticed saturation C' after conversion, appropriately converts the RGB signal and outputs the result to a display 8 such as a display monitor.

Further, in the fifth embodiment, the saturation conversion control means 303 used in the above fourth embodiment can also be used in place of the saturation conversion control means 301. Use of the saturation conversion control means 303 emphasizes the pixels having a saturation higher than the threshold $\alpha$ and improves saturation contrast.

The sixth embodiment

Next, a color image processor and a color image processing method according to the sixth embodiment of the present invention will be described.

Figure 9:
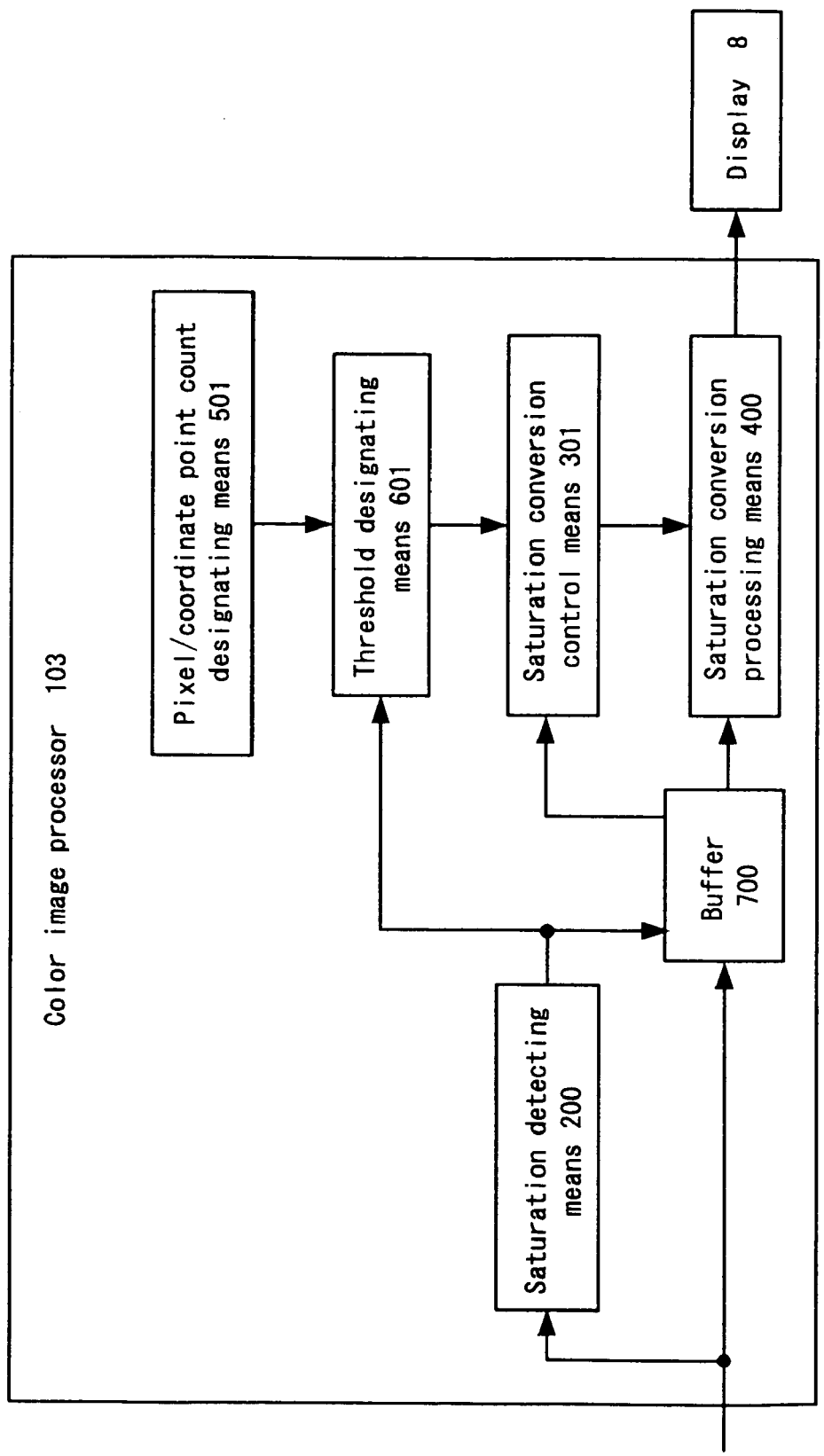
FIG. 9 is a block diagram showing an overall configuration of a color image processor according to the sixth embodiment of the present invention.

FIG. 9 is a block diagram showing an overall configuration of a color image processor according to the sixth embodiment of the present invention.

The color image processor 103 according to the sixth embodiment includes: as shown in FIG. 9, a saturation detecting means 200, a saturation conversion control means 301, a saturation conversion processing means 400, a threshold determining means 601, a buffer 700 and a pixel/coordinate point count designating means 501.

The saturation detecting means 200 and saturation conversion processing means 400 operate in the same manner as that of the first embodiment described with reference to FIG. 6. The saturation conversion control means 301 operates in the same manner as that of the third embodiment described with reference to FIG. 7. Further, data accumulated in buffer 700 includes the RGB signal, saturation information for each pixel/coordinate point and variable f used in saturation conversion, as in the case of the fifth embodiment described with reference to FIG. 8.

Pixel/coordinate point count designating means 501 may be constituted of, for example, a dedicated numeral input device such as numeral keys, a multi-purpose input device such as PC keyboard. The user inputs the pixel/coordinate point count k for determining a threshold through the pixel/coordinate point count designating means 501. The pixel/coordinate point count designating means 501 gives notice of the input pixel/coordinate point count k to threshold determining means 601.

Threshold determining means 601 determines the threshold based on the noticed pixel/coordinate point count k and the saturation C at each pixel/coordinate point noticed from saturation detecting means 200. The method for determining the threshold is that, for example, the value of saturation of a pixel/coordinate point which has the k-th lowest saturation may be set as the threshold and passed to saturation conversion control means 301. In other words, saturation suppression or saturation enhancement is applied only to the designated number of pixels/coordinate points.

In the color image processor 103 according to the sixth embodiment, the user first designates the number k of pixels/coordinate points to be reduced or enhanced in saturation through pixel/coordinate point count designating means 501. Then, saturation detecting means 200 detects saturation C of the RGB signal, input successively for each pixel/coordinate point from saturation detecting means 200, and stores it together with the RGB signal into buffer 700 and gives notice of the saturation C to threshold determining means 601. When input of the RGB signal and detection of saturation is complete for a predetermined area so that the RGB signal and saturations for the predetermined area are accumulated into buffer 700, threshold determining means 601 determines the threshold $\alpha$ based on the noticed saturation C and the pixel/coordinate point count k designated by the user and passes it to saturation conversion control means 301.

The saturation conversion control means 301 calculates the saturation C' after conversion based on the noticed threshold $\alpha$ and sends it to saturation conversion processing means 400.

Saturation conversion processing means 400, based on the input RGB signal and the noticed saturation C' after conversion, appropriately converts the RGB signal and outputs the result to a display 8 such as a display monitor.

Further, in the sixth embodiment, the saturation conversion control means 303 used in the above fourth embodiment can also be used in place of the saturation conversion control means 301. Use of the saturation conversion control means 303 emphasizes the pixels having a saturation higher than the threshold $\alpha$ and improves saturation contrast.

The seventh embodiment

Next, a color image processor and a color image processing method according to the seventh embodiment of the present invention will be described.

Figure 10:
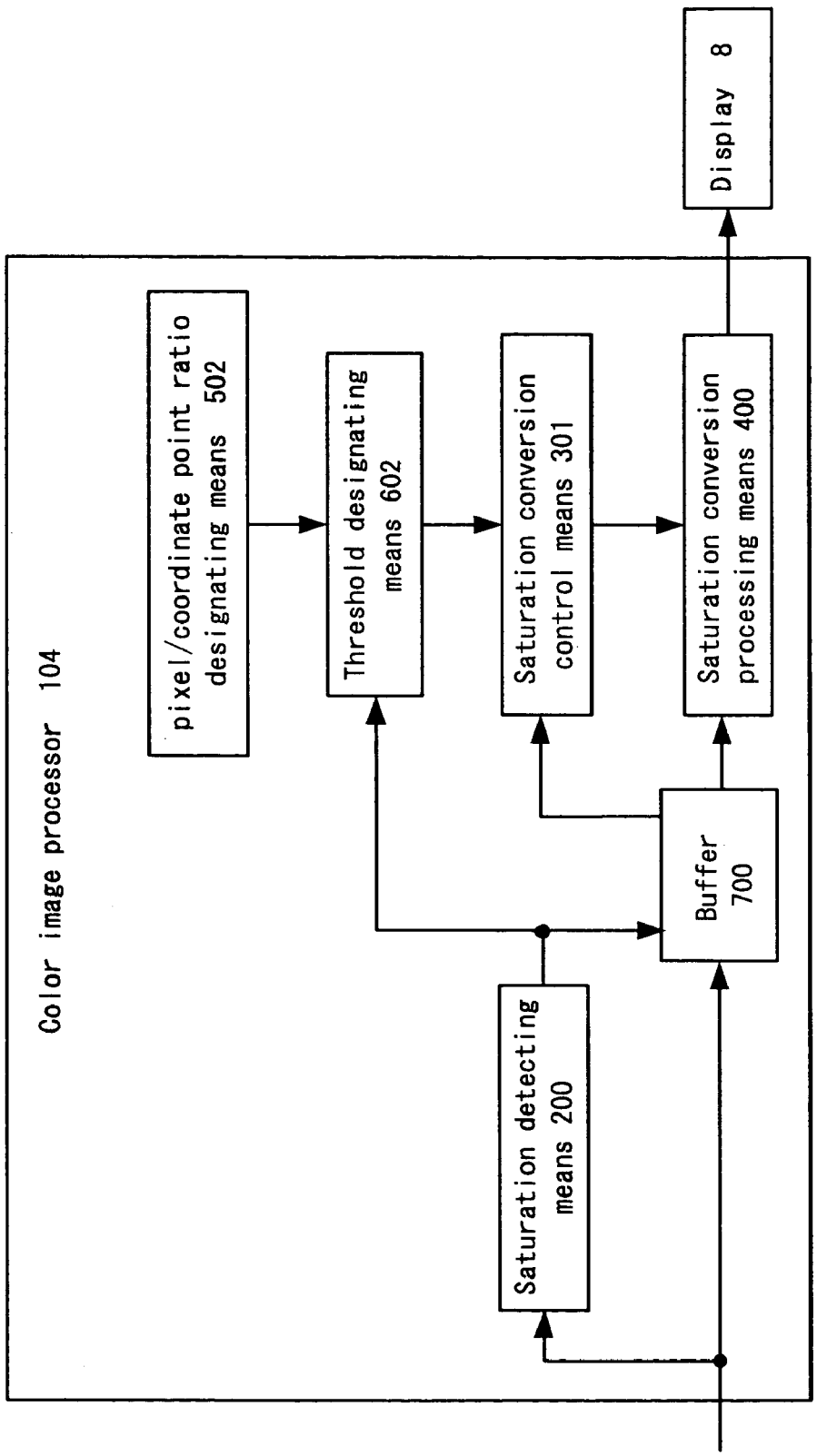
FIG. 10 is a block diagram showing an overall configuration of a color image processor according to the seventh embodiment of the present invention.

FIG. 10 is a block diagram showing an overall configuration of a color image processor according to the seventh embodiment of the present invention.

The color image processor 104 according to the seventh embodiment includes: as shown in FIG. 10, a saturation detecting means 200, a saturation conversion control means 301, a saturation conversion processing means 400, a threshold determining means 602, a buffer 700 and a pixel/coordinate point ratio designating means 502.

The saturation detecting means 200 and saturation conversion processing means 400 operate in the same manner as that of the first embodiment described with reference to FIG. 6. The saturation conversion control means 301 operates in the same manner as that of the third embodiment described with reference to FIG. 7. Further, data accumulated in buffer 700 includes the RGB signal, saturation information for each pixel/coordinate point and variable f used in saturation conversion, as in the case of the fifth embodiment described with reference to FIG. 8.

Pixel/coordinate point ratio designating means 502 may be constituted of, for example, a dedicated numeral input device such as numeral keys, a multi-purpose input device such as PC keyboard. The user inputs the pixel/coordinate point ratio p for determining a threshold through the pixel/coordinate point ratio designating means 502. The pixel/coordinate point ratio designating means 502 gives notice of the input pixel/coordinate point ratio p to threshold determining means 602.

Threshold determining means 602 determines the threshold based on the noticed pixel/coordinate point ratio p and the saturation C for each pixel/coordinate point, noticed from saturation detecting means 200. The method of determining the threshold is that, for example, if the number of pixels/coordinate points of an entire predetermined area is assumed to be k, the value of saturation of a pixel/coordinate point which has the (k×p)-th lowest saturation may be set as the threshold and passed to saturation conversion control means 301. In other words, saturation suppression or saturation enhancement is applied only to the pixels/coordinate points of the designated ratio.

In the color image processor 104 according to the seventh embodiment, the user first designates the ratio p of pixels/coordinate points to be reduced or enhanced in saturation through pixel/coordinate point count designating means 502. Then, the color image processor 104 detects saturation C of the RGB signal, input successively for each pixel/coordinate point from saturation detecting means 200, and stores it together with the RGB signal into buffer 700 and gives notice of the saturation C to threshold determining means 602. When input of the RGB signal and detection of saturation is complete for a predetermined area so that the RGB signal and saturations for the predetermined area are accumulated into buffer 700, threshold determining means 602 determines the threshold α based on the noticed saturation C and the pixel/coordinate point ratio p designated by the user and notices the result to saturation conversion control means 301.

The saturation conversion control means 301 calculates the saturation C' after conversion based on the noticed threshold α and sends it to saturation conversion processing means 400.

Saturation conversion processing means 400, based on the input RGB signal and the noticed saturation C' after conversion, appropriately converts the RGB signal and outputs the result to a display 8 such as a display.

Further, in the seventh embodiment, the saturation conversion control means 303 used in the above fourth embodiment can also be used in place of the saturation conversion control means 301. Use of the saturation conversion control means 303 emphasizes the pixels having a saturation higher than the threshold α and improves saturation contrast.

The eighth embodiment

Next, a color image processor and a color image processing method according to the eighth embodiment of the present invention will be described.

Figure 18:
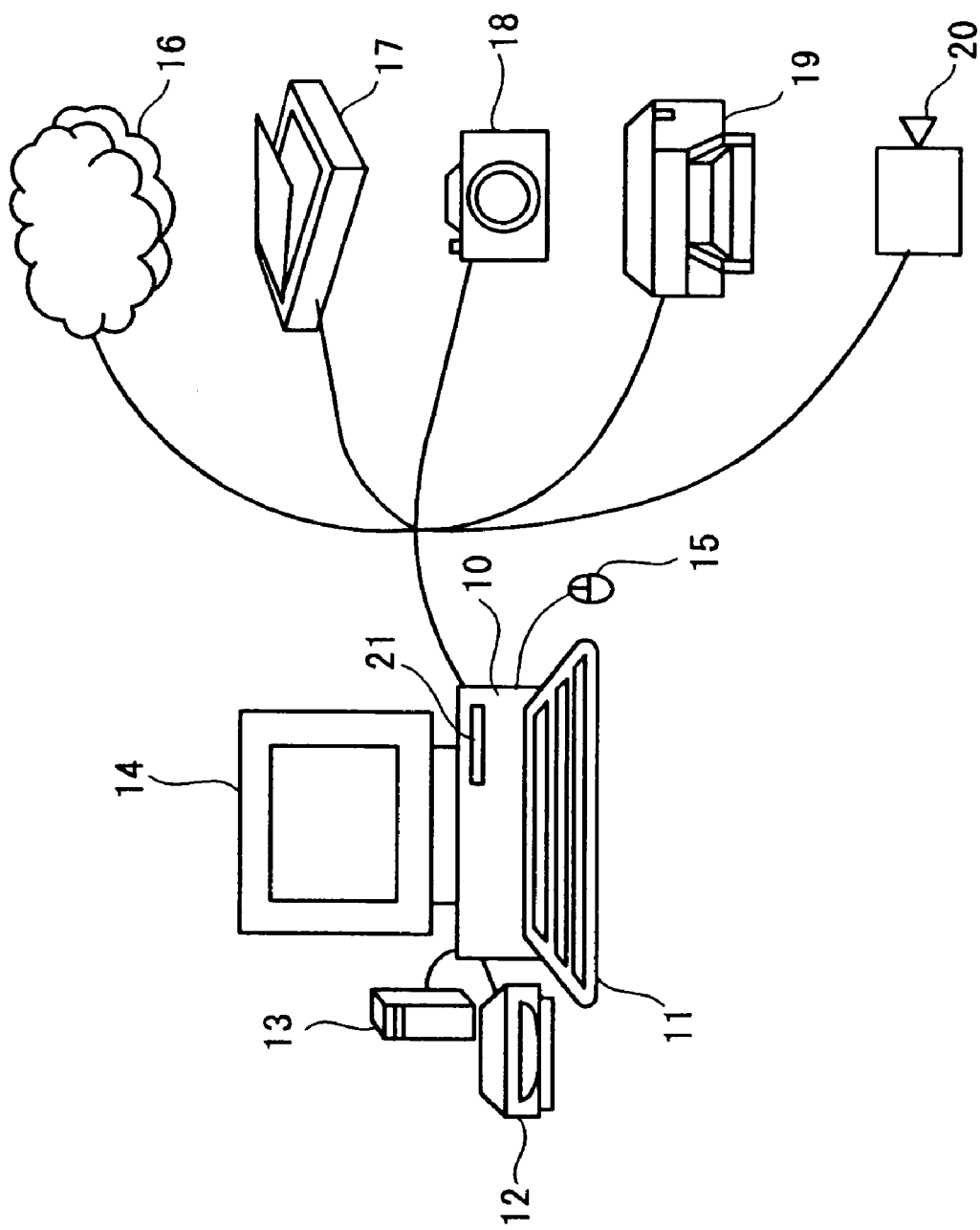
FIG. 18 is a schematic diagram showing an overall configuration of a color image processor according to the eighth embodiment of the present embodiment.

FIG. 18 is a schematic diagram showing an overall configuration of a color image processor according to the eighth embodiment of the present invention.

The color image processor and color image processing method according to the eighth embodiment are realized by installing software into a computer. Specifically, the computer program for realizing the color image processor and color image processing method according to each of the above embodiments is stored on a storage medium or distributed via electric communication lines such as internet, satellite communication lines, or the like. This computer program is installed into a personal computer etc., which is used domestically or in other ways, so that the personal computer will function as the color image processor of the present invention and realize the color image processing method of the present invention.

The color image processor according to the eighth embodiment is configured as shown in FIG. 18 so that image data input through an image input device such as a scanner 17, digital camera 18 and video camera 20, image data transmitted via a network 16, or image data stored in an external storage device such as a hard disk storage device 13, CD-ROM 12, floppy disk 21, is converted as to saturation using a personal computer 10 and the thus converted image data is output from a display 14 or printer 19. User input in the above third, fourth, sixth and seventh embodiments is realized by a keyboard 11 or mouse 15.

The ninth embodiment

Next, a color display according to the ninth embodiment of the present invention will be described.

Figure 21:
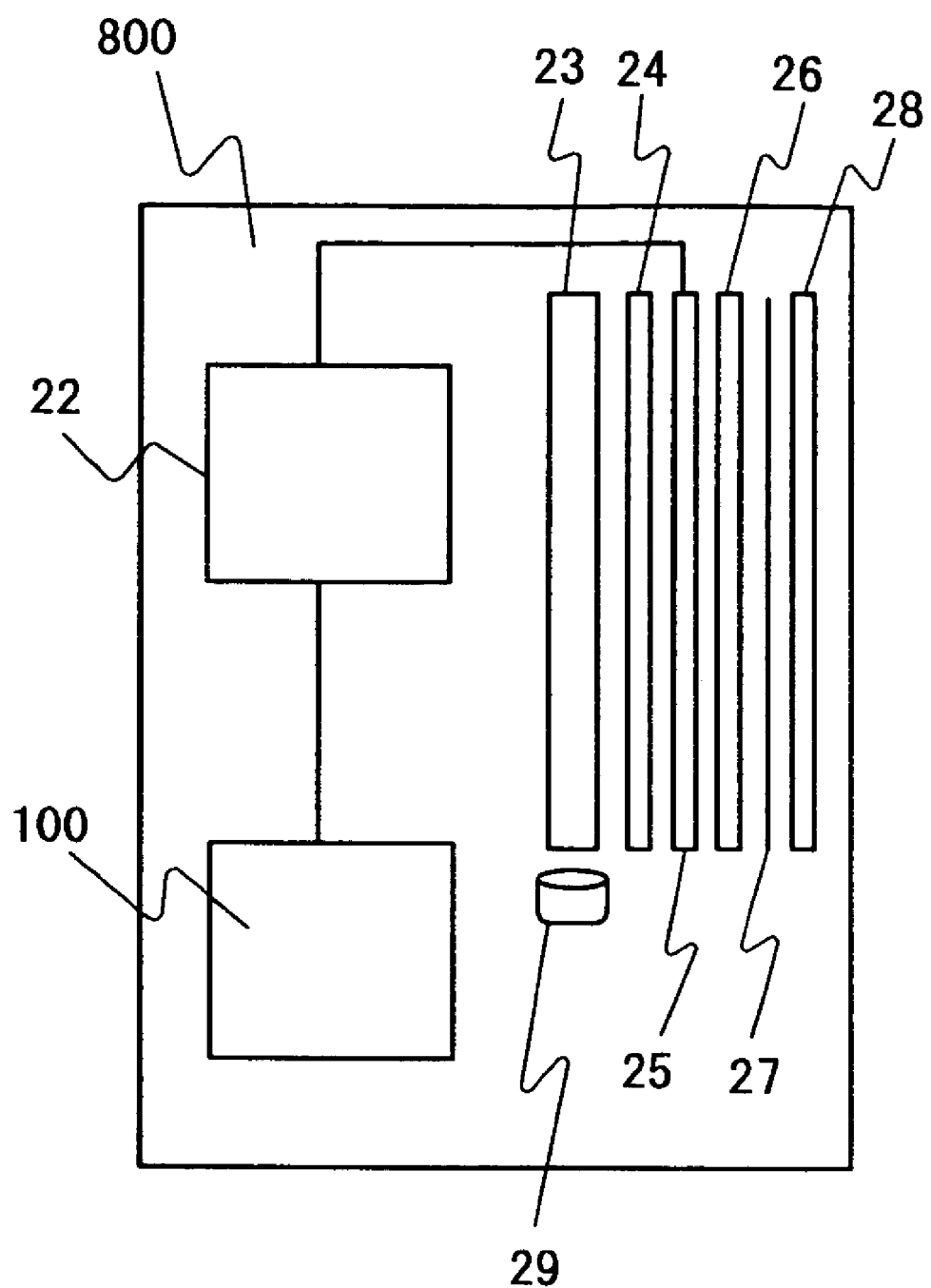
FIG. 21 is a view showing an overall configuration of a color display according to the ninth embodiment of the present invention.

FIG. 21 is a view showing an overall configuration of a color display according to the ninth embodiment of the present invention.

A color display 800 according to the ninth embodiment includes: as shown in FIG. 21, a color image processor 100; a liquid crystal panel control means 22; a light-guiding plate 23; a polarizer 24; a liquid crystal panel 25; a color filter 26; an optical film 27; a polarizer 28; and an LED 29.

Figure 23:
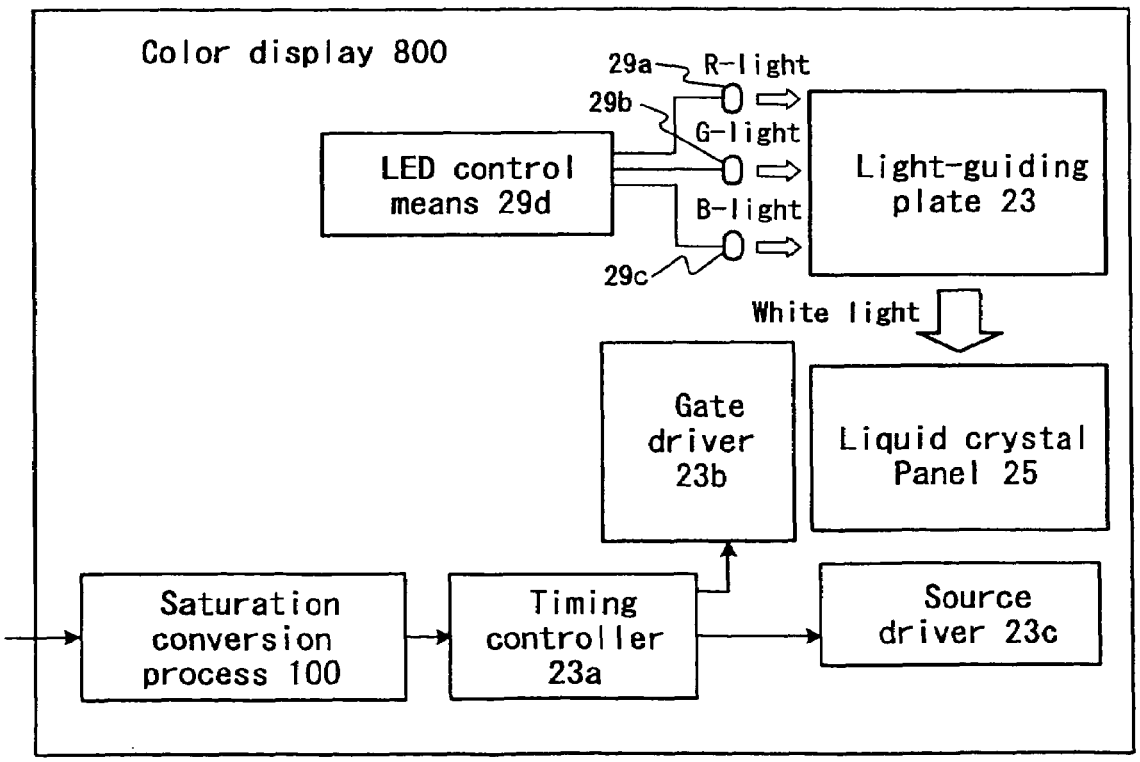
FIG. 23 is a block diagram showing an overall configuration of a color display according to the ninth embodiment of the present invention.

FIG. 23 is a functional block diagram showing the color display according to the embodiment of the present invention.

In FIG. 23, a timing controller 22a, a gate driver 22b, a source driver 22c correspond to the liquid crystal panel control means 22 in FIG. 21. The gray scale level is controlled for every pixel of liquid crystal panel 25 by controlling the applied voltages to gate driver 22b, and source driver 22c, while synchronizing them for every frame by timing controller 22a.

In FIG. 23, a red LED 29a, a green LED 29b, a blue LED 29c and an LED control means 29d correspond to the LED 29 in FIG. 21. In the configuration shown in FIG. 21, all the LEDs and the control means are shown integrally as LED 29 for easy understanding. Liquid crystal panel control means 22, based on the RGB signal input from color image processor 100, controls the amount of light transmission through each pixel of the liquid crystal panel. In a case where RGB signal values are specified from 0 to 255, if, for example, a R-signal value of 127 is input to a particular pixel, liquid crystal panel control means 22 applies a voltage to the corresponding pixel on liquid crystal panel 25 so that 50% of the light that can transmit when no voltage is applied passes therethrough.

Light guiding plate 23 is to guide light emitted from LED 29 uniformly to the entire backside of the lamination of polarizer 24, liquid crystal panel 25, color filter 26, optical film 27 and polarizer 28.

Figure 19:
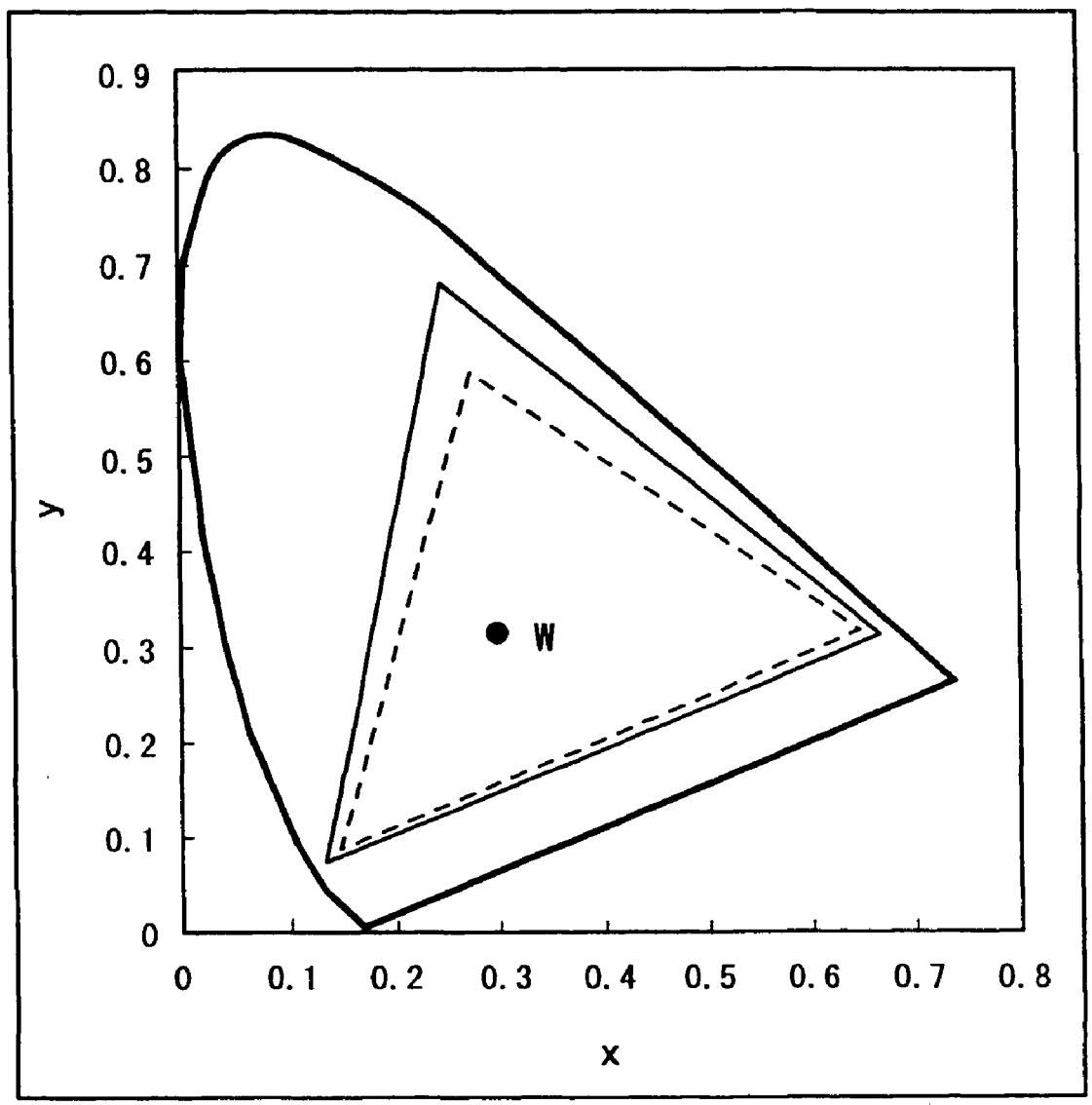
FIG. 19 is an illustrative view showing an example of reproducible color ranges of a conventional transmission type color display and a color display excellent in color reproduction.
Figure 20:
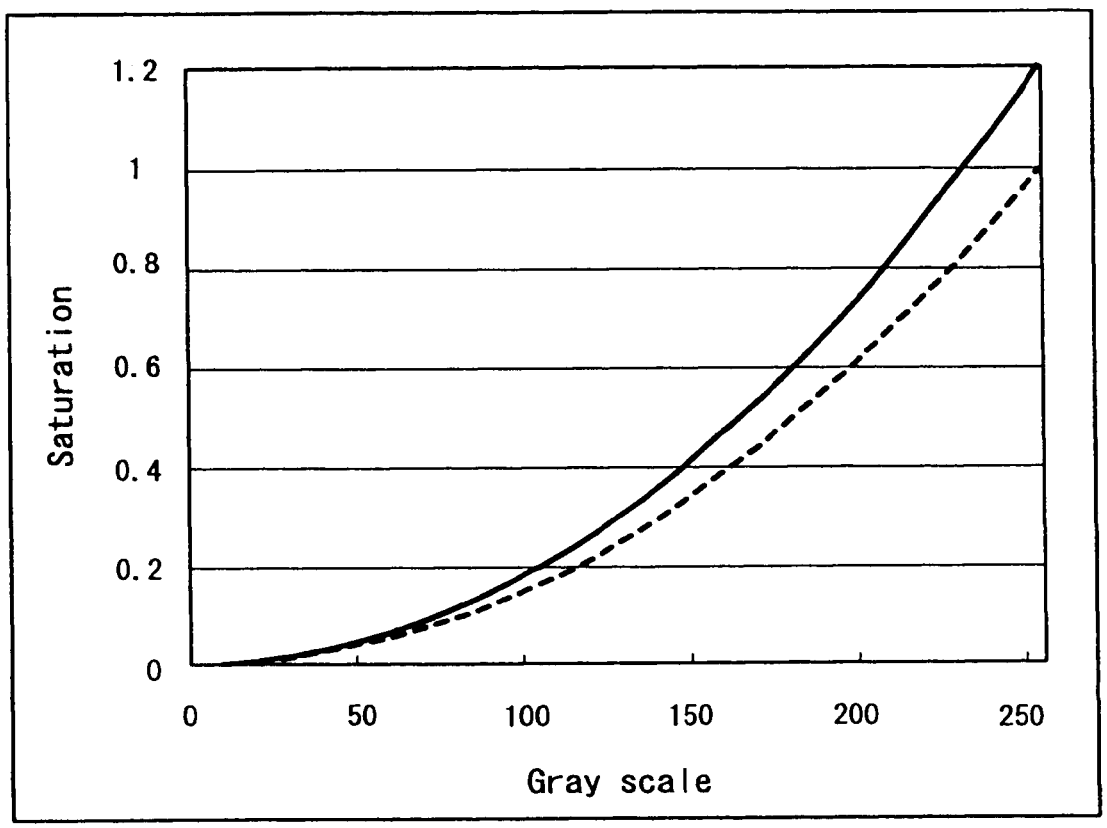
FIG. 20 is an illustrative view showing examples of the relationship between gray scale and saturation for a conventional transmission type color display and a color display excellent in color reproduction.

Color filter 26 is a color filter optimized as to transmission spectrum for high color reproduction. In color filter 26, the wavelength ranges where transmittance is high approximately coincide with the peak wavelengths of LED 29. Therefore, color display 800 presents a broader color reproducible range in the chromaticity diagram than conventional transmission type displays do, as shown in FIG. 19.

The operation of color image processor 100 is the same as that of the first embodiment described with reference to FIG. 6.

In color display 800 according to the ninth embodiment, when the input RGB signal presents low saturation, color image processor 100 first converts the RGB signal so as to further reduce the saturation. Liquid crystal panel control means 22 controls light transmittance of each pixel of liquid crystal panel 25 in accordance with the RGB signal after conversion.

As shown in this configuration, combination of a color display having a broad color reproduction range with a color image processor which further reduces the saturation of areas with low saturations, makes it possible to display more vivid and highly-saturated colors for only the areas with high saturations while suppressing the saturation of medium color to much the same level as conventional color displays.

Figure 22:
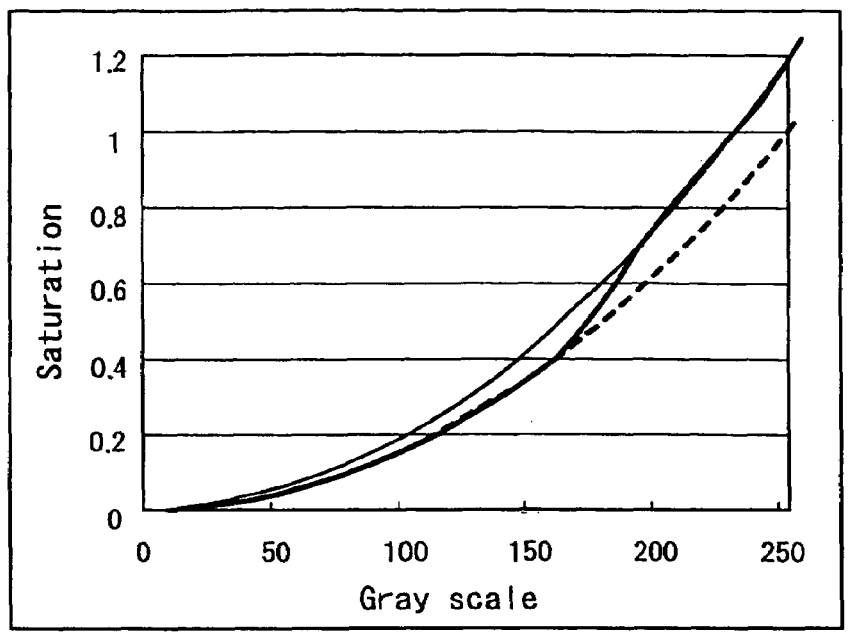
FIG. 22 is an illustrative view showing examples of the relationship between gray scale and saturation for a conventional transmission type color display, a color display excellent in color reproduction, and a color display according to the ninth embodiment of the present invention.

FIG. 22 shows examples of the relationship between gray scale level and saturation. In FIG. 22, the broken line indicates change in saturation, normalized by making the maximum equal to 1, when the gray scale level of one color of RGB is varied from 0 to 255, i.e., the maximum level. The solid line indicates change in saturation in a high color reproduction display. The thick line shows change in saturation in color display 800 according to the ninth embodiment. According to color display 800 of the ninth embodiment, the saturation in the range where gray scale level and saturation are low is suppressed almost equivalent to the conventional transmission type color display, in contrast to the high-color reproduction color display having no color image processor 100.

Further, in the ninth embodiment, any of color image processors 101 to 106 used in the above second to seventh embodiments can be used in place of color image processor 100.

The color image processing method, color image processor, color display device and a computer program for implementing the color image processing method are suitable for color facsimile machines, color copiers and the like, which detect saturation at every pixel and implement saturation suppress control over areas having low saturations, so as to produce improved color images enhanced in feeling of depth and feeling of sharpness.

The invention claimed is:
1. A color image processor comprising:
    a saturation detecting section for detecting saturation at every pixel in a digital color image or at every coordinate point in an analog color image; and
    a saturation conversion processing section for converting the saturation at a pixel or at a coordinate point by using a non-linear function which implements a saturation reduction, when the saturation detected by the saturation detecting section at the pixel or the coordinate point is smaller than a predetermined threshold.
2. A color image processor comprising:
    a saturation detecting section for detecting saturation at every pixel in a digital color image or at every coordinate point in an analog color image; and
    a saturation conversion processing section for converting the saturation at a pixel or at a coordinate point by implementing a saturation reduction, when the saturation detected by the saturation detecting section at the pixel or the coordinate point is smaller than a predetermined threshold,
    wherein the threshold is a value that can be set arbitrarily.
3. A color image processor comprising:
    a saturation detecting section for detecting saturation at every pixel in a digital color image or at every coordinate point in an analog color image; and
    a saturation conversion processing section for converting the saturation at a pixel or coordinate point by implementing a saturation reduction, when the saturation detected by the saturation detecting section at the pixel or the coordinate point is smaller than a predetermined threshold,
    wherein the threshold is determined based on an input designated by a user.
4. A color image processor comprising:
    a saturation detecting section for detecting saturation at every pixel in a digital color image or at every coordinate point in an analog color image; and
    a saturation conversion processing section for converting saturation at a pixel or at a coordinate point by implementing a saturation reduction, when the saturation detected by the saturation detecting section at the pixel or the coordinate point is smaller than a predetermined threshold,
    wherein the threshold is determined based on a distribution of saturations at a plurality of pixels or at coordinate points included in a predetermined area.
5. The color image processor according to any one of claims 1-4, wherein the saturation conversion processing section enhances saturation at a pixel or at a coordinate point, when the saturation detected by the saturation detecting section at the pixel or the coordinate point is greater than a predetermined threshold.
6. A color display wherein the color image processor according to any one of claims 1-4 is provided.
7. The color display according to claim 6 wherein LEDs are provided as a light source device.
8. The color image processor according to claim 4, wherein the threshold is a value of a predetermined number-th saturation with respect to a saturation size in the distribution of the saturations at the plurality of pixels or coordinate points.
9. The color image processor according to claim 8, wherein the predetermined number-th is determined based on an input designated by a user.
10. The color image processor according to claim 4, wherein the threshold is a value of a saturation of a predetermined ratio with respect to a saturation range in the distribution of the saturations at the plurality of pixels or coordinate points.
11. The color image processor according to claim 10, wherein the predetermined ratio is determined based on an input designated by a user.
12. A color image processing method, comprising:
    detecting saturation at every pixel in a digital color image or at every coordinate point in an analog color image; and
    converting saturation at a pixel or at a coordinate point by using a non-linear function which implements a saturation reduction, when the saturation detected at the pixel or at the coordinate point is smaller than a predetermined threshold.
13. A color image processing method, comprising:
    detecting saturation at every pixel in a digital color image or at every coordinate point in an analog color image; and
    converting saturation at a pixel or at a coordinate point by implementing a saturation reduction, when the saturation detected at the pixel or at the coordinate point is smaller than a predetermined threshold,
    wherein the threshold is a value that can be set arbitrarily.
14. A color image processing method, comprising:
    detecting saturation at every pixel in a digital color image or at every coordinate point in an analog color image; and converting saturation at a pixel or at a coordinate point by implementing a saturation reduction, when the saturation detected at the pixel or at the coordinate point is smaller than a predetermined threshold, wherein the threshold is determined based on an input designated by a user.

15. A color image processing method, comprising:

detecting saturation at every pixel in a digital color image or at every coordinate point in an analog color image; and converting saturation at a pixel or at a coordinate point by implementing a saturation reduction, when the saturation detected at the pixel or at the coordinate point is smaller than a predetermined threshold, wherein the threshold is determined based on a distribution of saturations at a plurality of pixels or at coordinate points included in a predetermined area.

16. The color image processing method according to any one of claims 12-15, further comprising:

converting saturation at a pixel or at a coordinate point by implementing a saturation enhancement, when the saturation detected at the pixel or at the coordinate point is greater than a predetermined threshold.

17. The color image processing method according to claim 15, wherein the threshold is a value of a predetermined number-th saturation with respect to a saturation size in the distribution of the saturations at the plurality of pixels or coordinate points.

18. The color image processing method according to claim 17, wherein the predetermined number-th is determined based on an input designated by a user.

19. The color image processing method according to claim 15, wherein the threshold is a value of a saturation of a predetermined ratio with respect to a saturation range in the distribution of the saturations at the plurality of pixels or coordinate points.

20. The color image processing method according to claim 19, wherein the predetermined ratio is determined based on an input designated by a user.

21. A computer program residing on a computer readable medium including a set of instructions, executed by a processor, for realizing a color image processing method, the method including:

detecting saturation at every pixel in a digital color image or at every coordinate point in an analog color image; and converting saturation at a pixel or at a coordinate point by using a non-linear function which implements a saturation reduction, when the saturation detected at the pixel or at the coordinate point is smaller than a predetermined threshold.

22. A computer program residing on a computer readable medium including a set of instructions, executed by a processor, for realizing a color image processing method, the method comprising:

detecting saturation at every pixel in a digital color image or at every coordinate point in an analog color image; and converting saturation at a pixel or at a coordinate point by using a non-linear function which implements a saturation reduction, when the saturation detected at the pixel or at the coordinate point is smaller than a predetermined threshold, wherein the threshold is a value that can be set arbitrarily.

23. A computer program residing on a computer readable medium including a set of instructions, executed by a processor, for realizing a color image processing method, the method comprising:

detecting saturation at every pixel in a digital color image or at every coordinate point in an analog color image; and converting saturation at a pixel or at a coordinate point by using a non-linear function which implements a saturation reduction, when the saturation detected at the pixel or at the coordinate point is smaller than a predetermined threshold, wherein the threshold is determined based on an input designated by a user.

24. A computer program residing on a computer readable medium including a set of instructions, executed by a processor, for realizing a color image processing method, the method comprising:

detecting saturation at every pixel in a digital color image or at every coordinate point in an analog color image; and converting saturation at a pixel or at a coordinate point by using a non-linear function which implements a saturation reduction, when the saturation detected at the pixel or at the coordinate point is smaller than a predetermined threshold, wherein the threshold is determined based on a distribution of saturations at a plurality of pixels or at coordinate points included in a predetermined area.

* * * * *